(12) United States Patent  
Nikunen et al.

(10) Patent No.: US 10,114,987 B2
(45) Date of Patent: Oct. 30, 2018

(54) ADAPTIVE RFID READER

(71) Applicant: METSO FLOW CONTROL OY, Vantaa (FI)

(72) Inventors: Joona Nikunen, Pirkkala (FI); Mats Friman, Tampere (FI)

(73) Assignee: Metso Oyj, Helsinki (FI)

( * ) Notice: Subject to any disclaimer, the term of this patent is extended or adjusted under 35 U.S.C. 154(b) by 0 days.

(21) Appl. No.: 15/322,524

(22) PCT Filed: Jul. 3, 2015

(86) PCT No.: PCT/FI2015/050487
§ 371 (c)(1),
(2) Date: Dec. 28, 2016

(87) PCT Pub. No.: WO2016/005663
PCT Pub. Date: Jan. 14, 2016

(65) Prior Publication Data
US 2017/0132439 A1    May 11, 2017

(30) Foreign Application Priority Data

Jul. 7, 2014   (FI) ...................................... 20145656

(51) Int. Cl.
*G06K 19/06* (2006.01)
*G06K 7/10* (2006.01)

(52) U.S. Cl.
CPC ..... *G06K 7/10227* (2013.01); *G06K 7/10366* (2013.01)

(58) Field of Classification Search
CPC ........................ G06K 7/10227; G06K 7/10366
(Continued)

(56) References Cited

U.S. PATENT DOCUMENTS 6,617,963 B1    9/2003  Watters et al.
7,347,379 B2 *  3/2008  Ward .................. G06K 7/10336
                                            235/492

(Continued)

FOREIGN PATENT DOCUMENTS

GB          2503467 A      1/2014
WO      2015/101695 A1     7/2015

OTHER PUBLICATIONS

Pesonen et al., "Smart RFID Tags," Feb. 2009, I-Tech, Vienna, Austria; pp. 159-178; http://www.intechopen.com/books/development_and_implementation_of_rfid_technology.

(Continued)

*Primary Examiner* — Paultep Savusdiphol
(74) *Attorney, Agent, or Firm* — Oliff PLC

(57) ABSTRACT

A system having a radio frequency identification (RFID) reader and at least one passive RFID sensor tag, the RFID reader sends a radio frequency interrogation signal from to the passive RFID sensor tag having a sensor that provides a sensor value. The RFID reader receives from the passive RFID tag a backscattered radio frequency signal carrying the sensor value. An interrogation rate of the sensor tag, an accuracy of interrogation and/or a power of the radio frequency interrogation signal transmitted to the sensor tag is controlled based on a statistical analysis of the multiple received sensor values, multiple interrogations and/or a signal-to-noise ratio.

19 Claims, 12 Drawing Sheets

(58) Field of Classification Search
USPC .......................... 235/451, 435, 492
See application file for complete search history.

(56) References Cited

U.S. PATENT DOCUMENTS

| | | | |
|---|---|---|---|
| 7,679,522 B2* | 3/2010 | Carpenter | B62B 3/1424 235/383 |
| 7,825,806 B2 | 11/2010 | Calvarese | |
| 8,179,232 B2* | 5/2012 | Tuttle | G06K 7/10346 235/383 |
| 8,410,906 B1* | 4/2013 | Dacus | G06K 7/10039 340/10.1 |
| 9,030,300 B2* | 5/2015 | Jones | G06K 7/10217 235/435 |
| 9,672,394 B2* | 6/2017 | Han | G06K 7/10366 |
| 2006/0197652 A1* | 9/2006 | Hild | G06K 7/0008 340/10.2 |
| 2012/0319862 A1 | 12/2012 | Nagy et al. | |
| 2013/0099897 A1 | 4/2013 | Forster | |
| 2013/0265139 A1 | 10/2013 | Nummila et al. | |
| 2014/0084060 A1 | 3/2014 | Jain et al. | |

OTHER PUBLICATIONS

Chen et al, "Coupling Passive Sensors to UHF RFID Tags," Radio and Wireless Symposium (RWS), 2012 IEEE, Jan. 15-18, 2012, Santa Clara, 255-258.

Guerin et al., "A temperature and gas sensor integrated on a 915MHz RFID UHF tag," Wireless Information Technology and Systems (ICWITS), 2010 IEEE International Conference, Honolulu, Aug. 28, 2010-Sep. 3, 2010.

Feb. 19, 2015 Search Report issued in Finnish Patent Application No. 20145656.

Oct. 1, 2015 International Search Report issued in International Patent Application No. PCT/FI2015/050487.

Oct. 1, 2015 Written Opinion issued in International Patent Application No. PCT/FI2015/050487.

Feb. 15, 2018 Extended European Search Report issued in EP 15819358.1.

* cited by examiner

ADAPTIVE RFID READER

FIELD OF THE INVENTION

The present invention relates to passive wireless sensors, particularly passive radio frequency identification (RFID) sensors, RFID sensor systems, and RFID readers for passive RFID sensor tags.

BACKGROUND OF THE INVENTION

Sensor is a device that transforms a measured quantity into a readable format, typically into an electrical signal. Nowadays, there are commercially available sensors virtually for any measurement purpose. According to the connectivity, sensors can be divided into wireless and wired sensors. Wired sensors are connected via wiring harnesses or cable assemblies to a reader device. Wireless sensors can be read without a physical connection to the sensor, and are often realized equipping the sensor with a radio transceiver. The transmitted radio signal is interpreted by a receiver which converts the wireless signal into a desired output. Wireless operation can be beneficial in many applications, where wired connection is difficult for example due to harsh operating conditions (like temperature and pressure), rotating parts, or cost and complexity of wiring. However, wireless sensors also have some drawbacks such as limited lifetime due to battery, limited read-out distance due to attenuation and interference, security issues because of the uncontrollable propagation of the signal and potentially low speed of communication. Based on the power source and communication principle, wireless sensors can be divided into three categories: active sensors, semi-passive sensors and passive sensors.

Active wireless sensors usually have both a radio transceiver and an on-board battery that is used to power up the transceiver. Active wireless sensors, having their own power sources, can use powerful transmitters and sensitive receivers. However, the battery on board limits the life time and also increases the size and weight. Due to more complex circuit, the price of an active sensor can be much higher than that of a passive sensor.

Semi-passive wireless sensors do not contain a radio transceiver, but are equipped with a battery. The battery is used to power up an integrated circuitry (IC) and enables the sensors to operate independently of the reader device or to maintain memory in the sensor. Semi-passive battery-assisted sensors utilize modulated backscattering technique for communication. This means that semi-passive sensors do not require any power from the on-board battery for transmission, but the sensor simply reflects back some of the power emitted by the reader device.

Unlike the active and semi-passive sensors, passive sensors do not require an on-board battery. Therefore they can be less complex, smaller, more inexpensive, and their lifetime is not limited by the power supply. The typical read-out distance of passive wireless sensors is between 10 cm and 3 m. Passive wireless sensors can be divided into four main categories: radio frequency identification (RFID) tags, electrical resonance circuit sensors, surface acoustic wave (SAW), harmonic sensors and intermodulation sensors.

RFID is an identification technology that uses radio waves to communicate between tags and a reader and it is used to identify items. There are a few advantages of RFID over optical barcode identification such as no line-of-sight is required between the reader device and the tag, and the RFID reader can also read hundreds of tags at a time. Passive RFID tags utilize the modulated backscattering communication principle which is illustrated in FIG. 1. When a tag 10 communicates with an RFID reader 11, it modulates the received signal 12 and reflects a portion of it 13 back to the reader. A typical passive tag consists of an antenna connected to an application specific microchip. When wirelessly interrogated by an RFID transceiver, or reader, the RFID tag antenna receives power and RF signals from the RFID reader and provides them to the chip. The chip processes the signals and sends the requested data back to the RFID reader. The backscattered signal is modulated according to the transmitted data. The highest operation frequency and read-out distance of RFID are limited by the rectified power for the integrated circuit (IC) and are a few GHz and 5-10 m, respectively.

RFID is mostly used for identification. RFID tags are equipped with a rewritable memory, which enables the reusability features of RFID tags, but they are not useful for measuring external quantities. RFID has also been shown to be suitable for sensing by equipping an RFID tag with an external sensor and digital logic to read the external sensor. The advantage of this approach is that it would use a generic sensor element and thus would be well suited for a very broad range of applications. In this approach, however, an additional A/D converter and digital circuitry has to be included to the tag in order to enable sensor read-out. Increased power consumption due to the additional electronics reduces the read-out range significantly (e.g., from 5 m to 0.3 m with an 8-bit A/D converter). An additional sensor element further increases power consumption. Implementation considerations of the A/D converter and additional digital circuits are discussed in [1]: Chapter 9 "Smart RFID Tags", in the book "Development and Implementation of RFID Technology", ISBN 978-3-902613-54-7, February 2009, I-Tech, Vienna, Austria. http://www.intechopen.com/books/development_and_implementation_of_rfid_technology.

US2013/0099897 discloses an RFID reader, an RFID chip, and an antenna electrically coupled to the RFID chip and configured to receive signals from and transmit signals to the RFID reader. The RFID chip is provided with an electrical interface to a sensing material. The RFID chip is configured to modulate a signal received from a reader and to drive the sensing material with the modulated signal. The sensing material has a variable electrical property, such that the backscattered modulated signal will change according to the condition of the sensing material. Regardless of the nature of the sensing material, it interacts with the modulated signal from the RFID chip and returns the signal to the RFID chip. The returned signal is passed from the RFID chip to the antenna via the backscatter modulator and then transmitted back to the RFID reader. Alternatively, the signal processed by the sensing material is used to modulate the input impedance of the RFID chip, with a signal from the RFID chip being backscattered to the RFID reader by the antenna to determine the condition of the sensing material.

Chen et al, Coupling Passive Sensors to UHF RFID Tags, Radio and Wireless Symposium (RWS), 2012 IEEE, 15-18 Jan. 2012, Santa Clara, 255-258, explores the possibility of coupling passive sensor data to existing UHF RFID tags without designing a new tag ASIC. The existing UHF RFID system can be used to convey additional data by overlaying a coupling loop on the tag antenna and modulating vector backscatter. The impedance of the passive sensor carrying the sensor data influences the value of amplitude and phase of the backscattering. For the transmission of the passive sensor data, the load of the passive sensor coupling module is switched between these three loads to provide the connection to one of the two reference impedances or the passive sensor. With two reference impedances, the impedance of the passive sensor is determined.

Guerin et al., A temperature and gas sensor integrated on a 915 MHz RFID UHF tag, Wireless Information Technology and Systems (IC-WITS), 2010 IEEE International Conference, Honolulu, Aug. 28, 2010-Sep. 3 2010 discloses a passive wireless sensor utilizing the modulated backscattering principle. The modulation signal is generated by a voltage-controlled oscillator whose control voltage and thereby the output frequency is arranged to change in function of the sensor value.

Co-pending PCT/FI2013/051214 discloses passive wireless sensor design that enables a radically increased reading distance of passive wireless sensors. The modulation signal is generated by an oscillator that includes a sensing element as a part of an oscillating circuit, such that the modulation frequency is dependent on a sensed value of the sensing element. Thus, the sensor value is translated into a frequency of modulated analog signal which can be generated without an energy consuming AD conversion and with minimum number of extra component. As a result the reading distance can be increased up to several meters, to a room scale.

Reading passive RFID sensors requires "on-air" time for powering the sensor. The time needed can be very short, such as 2-3 ms, or relatively long, such as 10-50 ms, depending on the sensor used. The radio bandwidth available for RFID communication is not unlimited but actually very scarce. If multiple sensors must be interrogated very often, there is a lot of radio noise within the RFID spectrum. If sensors can be interrogated less often, more radio spectrum can be freed to other readers and sensors for communication. It is difficult to determine how often the sensors should be interrogated to keep the required sensor values up to date. Another problem relates to the very nature of wireless communication. There is constant sporadic noise affecting to the reading events. With moving objects there are also problems relating to a varying attenuation of the radio signal.

Different kind of algorithms has been created to tackle signal degradation, but they all need radio-level changes. Spatial multiplexing is a good way to improve radio communication. However, the spatial multiplexing is quite hard to put into practice due to complex electronics and calculations. Another typical way of managing link level problem is managing the signal power. Varying signal power eases to keep battery consumption minimal and reducing RF noise. An example of this approach is disclosed in U.S. Pat. No. 7,825,806.

Thus, there is a need for new techniques for adapting the interrogation of sensors to the varying radio-level conditions and interference.

BRIEF DESCRIPTION OF THE INVENTION

An object of the present invention is to provide a new technique for adapting the interrogation of sensors to the varying radio-level conditions and interference.

The objects of the invention are achieved by a method, a reader and a system according to the attached independent claims. The preferred embodiments of the invention are disclosed in the dependent claims.

An aspect of the invention is a method of controlling interrogation of sensor values in a system having a radio frequency identification (RFID) reader and at least one passive RFID sensor tag having at least sensing element that provides a value of a quantity sensed by the sensing element, comprising sending a radio frequency interrogation signal from the RFID reader to the passive RFID sensor tag;

receiving at the RFID reader from the passive RFID tag a backscattered radio frequency signal carrying the value of the sensed quantity;

controlling an interrogation rate of the sensing element and/or accuracy of received values of the sensed quantity and/or a power of the radio frequency interrogation signal transmitted to the sensing element based on an analysis of i) the multiple received values of the sensed quantity and/or ii) multiple interrogations and/or iii) a signal-to-noise ratio.

In an embodiment, the statistical analysis comprises comparing a new interrogated value and/or a signal-to-noise ratio of a new interrogated value with a criterion created based on the multiple received values of the sensed quantity and/or multiple interrogations.

In an embodiment, the criterion comprises at least one of a predicted value or value range of the value of a sensed quantity, a variance of a sensed quantity, a long-time average of a variance of a sensed quantity, an average of a signal-to-noise ratio of the backscattered signal over multiple integrations of the sensing element.

In an embodiment, the controlling comprises a) maintaining the interrogation rate of the sensing element, if a new interrogated value of the sensed quantity is acceptable according to said statistical analysis;

c) increasing at least temporarily the interrogation rate of the sensing element, if a new interrogated value of the sensed quantity is not acceptable according to said statistical analysis.

In an embodiment, the controlling comprises associating a new interrogated value of the sensed quantity with an accuracy information based on a signal-to-noise ratio of the backscattered signal, and/or rejecting a new interrogated value of the sensed quantity based on a signal-to-noise ratio of the backscattered signal, and/or adjusting a new interrogated value of the sensed quantity with an accuracy information based on a signal-to-noise ratio of the backscattered signal to im-prove accuracy.

In an embodiment, the controlling comprises a) predicting a value range for a next value or next values to be ingated from the sensing element based on a plurality of previous interrogated values of the quantity sensed by the sensing element;

b) maintaining the interrogation rate of the sensing element, if a new interrogated value of the sensed quantity falls within the predicted value range of the sensing element;

c) increasing at least temporarily the interrogation rate of the sensing element, if a new interrogated value of the sensed quantity falls out of the predicted value range of the sensing element.

In an embodiment, the increasing at least temporarily the interrogation rate of the sensing element comprises immediately reinterrogating the sensing element.

In an embodiment, the in-creasing at least temporarily the interrogation rate of the sensing element comprises performing immediate reinterrogations of the sensing element until the interrogated value of the sensed quantity is acceptable according to said statistical analysis.

In an embodiment, the con-trolling comprises a) predicting a value range for a next value or next values to be interrogated from the sensing element based on a plurality of previous interrogated values of the quantity sensed by the sensing element;

b) accepting a new interrogated value of the sensed quantity, if the new interrogated value falls within the predicted value range of the sensing element;

c) reinterrogating immediately the sensing element, if said new interrogated value of the sensed quantity falls out of the predicted value range of the sensing element;

d) accepting the reinterrogated value of the sensed quantity, if the reinterrogated value falls within the predicted value range of the sensing element, and dropping said new interrogated value;

e) accepting both said new interrogated value and said reinterrogated value of the sensed quantity, if also the reinterrogated value falls out of the predicted value range of the sensing element but said new interrogated value and said reinterrogated value are close to each other;

f) reinterrogating immediately the sensing element, if also said reinterrogated value of the sensed quantity falls out of the predicted value range of the sensing element and said new interrogated value and said reinterrogated value are close to each other;

g) continuing immediate reinterrogations of the sensing element until the reader obtains and accepts a reinterrogated value falling within the predicted value range or two reinterrogated values falling out of the predicted value range but being close to each other.

In an embodiment, the con-trolling comprises updating the predicted value with each accepted interrogat-ed value of the sensed quantity.

In an embodiment, the controlling comprises determining a long-time average of signal/noise ratio (SNR) of the backscattered signal during interrogation of the sensing element;

controlling the interrogation power and/or the interrogation rate of the sensing element using the long-time average of the SNR as a control reference.

In an embodiment, the method comprises determining a long-time average of a variance of the interrogated sensor values of the sensing element;

controlling the interrogation power and/or the interrogation rate of the sensing element using the long-time average of a variance of the interrogated sensor values as a control reference.

In an embodiment, the method comprises controlling the interrogation rate of the sensing element and the power of the radio frequency interrogation signal transmitted to the sensing element in parallel or in combination.

In an embodiment, the method comprises determining a long-time averages of signal/noise ratio (SNR) of the backscattered signal during interrogation of the sensing element in function of a variance of the interrogated sensor values;

controlling the power of the radio frequency interrogation signal transmitted to the sensing element using as a control reference the long-time average of the SNR corresponding a present variance of one or more latest interrogated sensor values;

determining a long-time average of a variance of the interrogated sensor values of the sensing element;

controlling the interrogation rate of the sensing element using the long-time average of a variance of the interrogated sensor values as a control reference.

In an embodiment, the method comprises controlling primarily the power of the radio frequency interrogation signal transmitted to the sensing element and controlling secondarily the interrogation rate of the sensing element.

In an embodiment, the method comprises increasing the interrogation rate of the sensing element only if the power of the radio frequency interrogation signal cannot be increased.

In an embodiment, the method comprises the controlling comprises determining a signal/noise ratio (SNR) of the backscattered signal during interrogation of an interrogated sensor value;

compensating an effect of a low signal/noise ratio (SNR) on the interrogated sensor value based on pre-stored compensation values and/or a compensation function, particularly if the power of the radio frequency interrogation signal cannot be increased.

In an embodiment, the method comprises the passive RFID sensor tag having an oscillator whose an oscillation frequency is dependent on a value of a quantity sensed by the sensing element;

the RFID reader receives from the passive RFID tag the backscattered radio frequency signal modulated with the oscillation frequency which is dependent on the value of the sensed quantity;

the RFID reader converts the oscillation frequency modulation of the backscattered signal into an actual value of the sensed quantity.

An another aspect of the invention is an RFID reader implementing the method according to the above aspect of the invention.

Still another aspect of the invention is a system comprising an RFID reader and a computer device implementing the method to the above aspect of the invention.

BRIEF DESCRIPTION OF THE DRAWINGS

In the following the invention will be described in greater detail by means of preferred embodiments with reference to the drawings, in which.

DETAILED DESCRIPTION OF THE INVENTION

Figure 1:
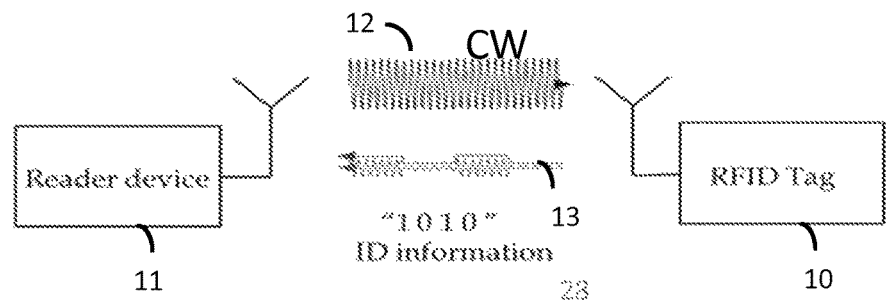
FIG. 1 illustrates backscattering communication principle in an RFID system.

Referring to FIG. 1, an RFID system typically comprises two basic components: an RFID transponder or tag 10, which is located on the object to be identified or at a measurement point; an RFID interrogator or reader 11, which performs the interrogation of RFID tags. In a passive RFID system the RFID reader 11 supplies the tag 10 with essential power in order for it to perform modulation of the reader's interrogation signal. In the case of RFID sensor tags, in addition to just providing a power source and medium for the RFID tags 10 to operate and transmit data, an RFID reader 11 may perform data transmission towards the tags 11 which is implemented, in most cases, as a modulation of the carrier signal.

Figure 2:
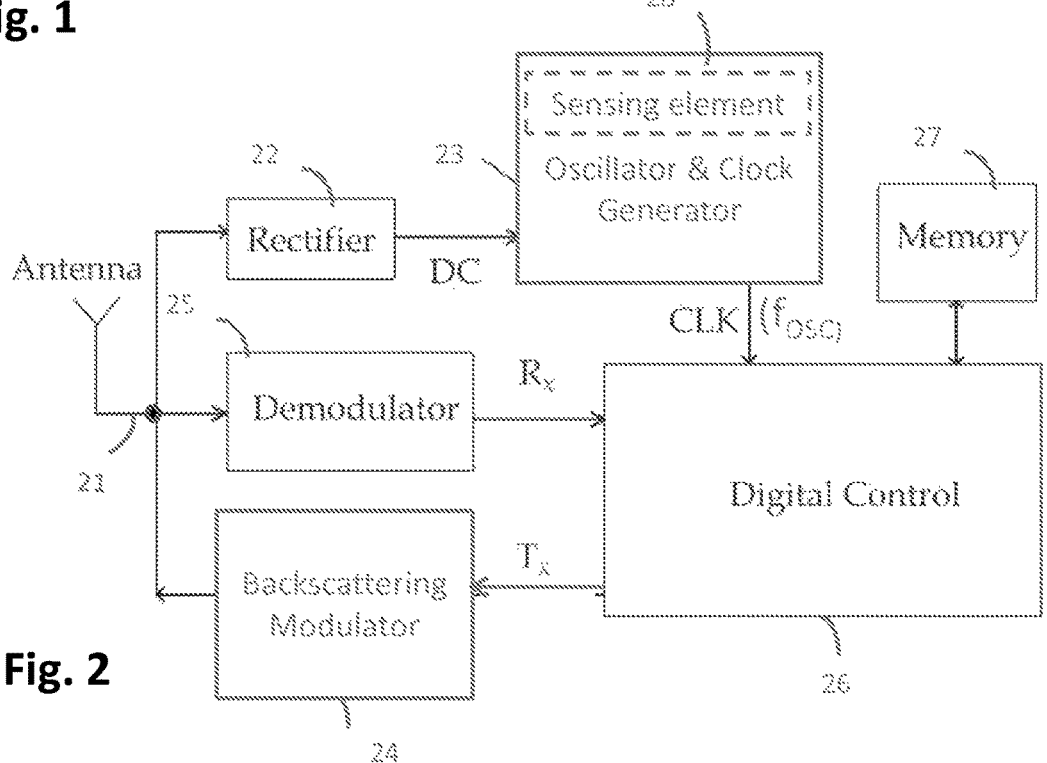
FIG. 2 is a functional block diagram illustrating an example of an RFID tag architecture.

FIG. 2 shows a functional block diagram illustrating a further example of radio frequency identity (RFID) tag architecture. In the illustrated example the RFID tag 10 may comprise an antenna 21 directly matched to the tag's front end impedance (matching circuit is not shown) to communicate with a RFID reader 11; an analogue RF front end that may typically contain rectifier circuitry 22 to convert RF power into a direct current (DC), a clock generator or oscillator 23, a modulator 24 and a demodulator 25. There may also be a logic part or a digital control module 26 that may be configured to provide desired functions, such as to handle interrogating commands, execute the anti-collision protocol, perform the data integrity check, run memory read-write operations, and perform output control and data flow. The logic implementation usually follows a defined standard and a certain associated protocol. Further, memory storage 27 may be provided. Depending on a user's requirement, non-volatile memory storage may be needed if both read/write capability is implemented.

As discussed above, the passive RFID tags utilize the modulated backscattering principle for communication. When a tag communicates with a reader, it modulates the received signal and reflects a portion of it back to the reader. The RFID sensor is actuated using an radio frequency (RF) continuous wave (CW) signal transmitted from the reader 11. First, the RF signal is converted to DC voltage by a rectifier 22. The rectified voltage powers up an oscillator 23, which produces a low frequency sinusoid fOSC at its output. Finally, the oscillation signal fOSC is fed to the backscatter modulator 24 to realize the backscattering principle. The modulator 24 modulates the signals, and those going back to the antenna 21 depend on the matching between the antenna and the rectifier 21/modulator 24. As a consequence, there are sidebands or subcarriers fCW−fOSC and fCW+fOSC in the signal backscattered from the sensor, as illustrated in the FIG. 3. fCW and fOSC represent the carrier frequency and oscillation frequency, respectively The sidebands or subcarriers are offset from the carrier fCW by the oscillation frequency fOSC. The oscillation frequency fOSC may also be referred to as a modulation frequency or a subcarrier frequency.

The clock frequency generation 23 may be realized with an oscillator whose frequency is dependent on a sensed value. This enables the sophisticated features of RFID and the possibility to measure external quantities without AD conversion. In exemplary embodiments, a sensing element is configured to an elementary part of an oscillating circuit of a tag oscillator such that the modulation frequency output from the oscillator is dependent on a sensed value. This enables the possibility to measure external quantities without practically any power consuming extra components. Examples of applicable oscillators may include an RC oscillator, a ring oscillator, an LC-oscillator, an RLC-oscillator, or any other resonant-based oscillator, such as an oscillator based on MEMS (microelectro-mechanical systems), SAW (surface acoustic wave), and BAW (bulk acoustic wave) resonators. The advantage of an RC-oscillator is that it can be integrated while it may have higher power consumption and reduced read-out distance in comparison with LC-oscillator or an RLC-oscillator, for example.

It should be appreciated that the intention is not to restrict the invention to any particular types of RFID sensor tags or any particular type of modulation of a backscattered signal by a sensor tag. However, embodiments of the invention are particularly advantageous in applications where a modulation oscillation frequency of the RFID sensor tag is arranged to be dependent on a sensed value, i.e. a value range of sensed quantity is mapped to an oscillation frequency range, such as in PCT/FI2013/051214, and in Guerin et al.

An aspect of the invention is a reader for a passive wireless sensor according to the other aspect of the invention. Generally, an RFID reader is a specialized radio transmitter and receiver. Like all such devices, the reader must generate signals at a carrier frequency $f_{CW}$ (e.g. around 800-900 MHz for typical UHF devices) and modulate this carrier signal to convey information to the tags. For passive tags, the reader may energize the tags with energy, receive the results and frequently handle the low-level anti-collision algorithms that allow the reader to read more than one tag at a time. In simple RFID systems, the reader's RF signal is a continuous wave (CW) signal or a pulsed on-off signal; in more sophisticated systems, the reader's RF signal can contain commands to the tag, instructions to read or write memory that the tag contains. The reader 11 may selectively receive and amplify responses from the tags, and convert the signal from the carrier frequency down to the much lower frequencies characteristic of the information contained in the received signal.

Figure 4:
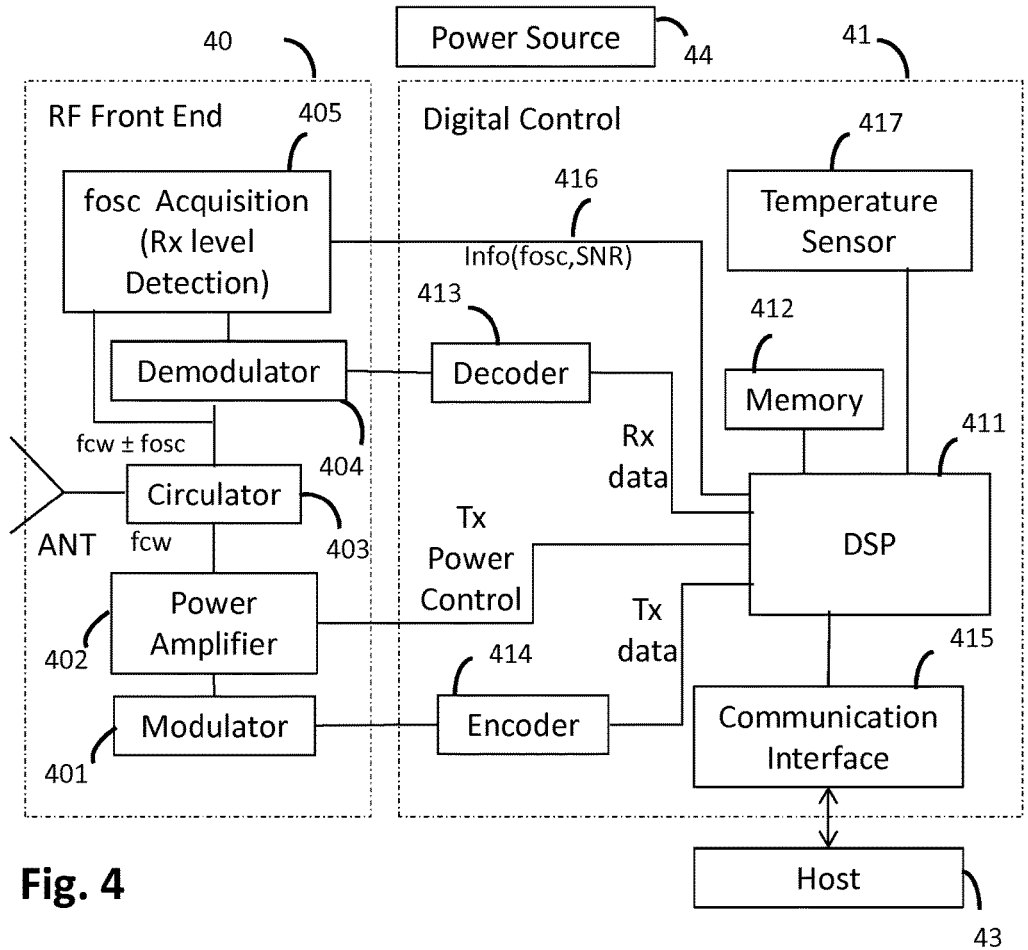
FIG. 4 is a functional block diagram illustrating an example of a an RFID reader architecture.

A general block diagram of an exemplary RFID reader is illustrated in FIG. 4. An RFID reader 11 may comprise two main sections: a radio frequency (RF) front end 40 and a digital control section 41. The radio frequency (RF) front end 40 is used for RF signal transmission and reception. The RF front end 40 may comprise two separate signal paths to correspond with the two directional data flows from and to the RFID sensor(s) 10. A modulator 401 may modulate a local oscillator signal (the RF carrier signal $f_{CW}$) with a Tx data (such as commands) from the digital control section 41. The modulated signal is amplified by the power amplifier 402, and the amplified signal, i.e. the RF power (effective isotropic radiated power, EIRP) and possible reader's command is transmitted via the antenna ANT to the sensor 10 which is situated within the reading zone or interrogation zone. The receiver receives the analog back-scattered signals from the sensor 10 via the antenna ANT. A directional coupler or circulator 403 separates the amplified transmitted signal to the sensor 10 and the received weak back-scattered signal fcw±fOSC from the sensor 10. The received back-scattered signal is weak and low noise amplifiers may be provided to increase the received signal's amplitude before and after the signal is demodulated in a demodulator 404. The demodulator 414 may then send the demodulated received signal RX data to the digital control section 41. Different demodulation techniques may be used when demodulating the data received from the transponder or tag 10. Examples of modulation and demodulation techniques used in RFID systems include binary phase shift keying (BPSK) and amplitude shift keying (ASK). The radiation intensity of the reader antenna ANT determines the interrogation range and zone. Depending on the RFID system's applications the RFID reader can be designed in different ways where the antenna's resonating frequency, gain, directivity and radiation pattern can vary.

The control section 41 of the RFID reader 11 may perform digital signal processing and procedures over the received (Rx) data from the RFID tag. Also, the control section 41 may enable the reader to communicate with the RFID tags wirelessly by performing modulation, anti-collision procedures and decoding the received data from the RFID tags 10. This data is usually used to interrogate tags (read) or to reprogram the tag (write). The control section 41 (e.g. a microprocessor) may usually include a digital signal processing (DSP) block 411, a memory block 412, a decoder block 413, an encoder block 414, and a communication interface block 415. The control section 41 may receive the received demodulated signal from the RF front end 40, and convert it to an equivalent digital signal. The decoder 413 may then decode the received signal to Rx data and the DSP 411 may perform data processing for the Rx data. The memory block 412 may store various data, such as interrogated Rx data, the reader's configuration parameters, sensor-specific parameters, etc. The encoder 414 of the control section 41 may encode a Tx data and output the encoded data to the RF front end 40 to modulate the carrier signal, when the control section 41 wants to send out a message or command to one particular tag or toward all of the tags 10 in the interrogation zone. Further, the control section 41 may control the RF transmission power of the RF front end 40, e.g. by controlling the gain of the power amplifier 402. All standard RFID digital communication may be received from wireless RFID sensors or tags 10 at carrier frequency fcw (using an appropriate modulation technique) and processed with the demodulator 404 and decoder 413. All common RFID functionality can be implemented with a commercial RFID reader, such as Mercury6e (M6e) embedded UHF RFID reader module from ThingMagic, a division of Trimble.

Figure 3:
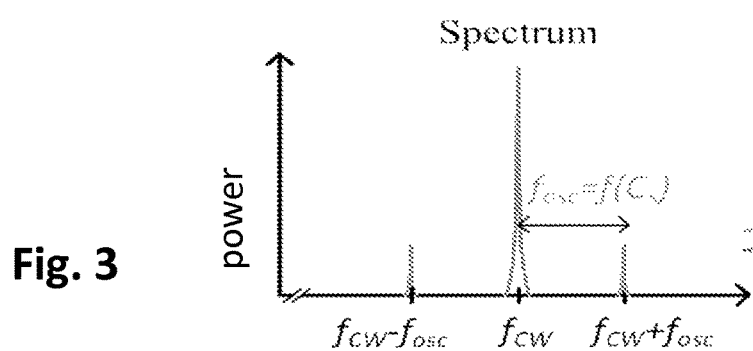
FIG. 3 is a spectral graph that illustrates the communication principle for a RFID sensor.

As discussed above, in a passive wireless sensor according to the first aspect of the invention the oscillation frequency fOSC of the wireless sensor can be made dependent or sensitive on the measured quantity. In other words, the fOSC is proportional to the sensed quantity at each specific moment. As also discussed above, the received back-scattered signal is modulated by the fOSC, i.e. the received backscattered signal has a frequency fCW±fOSC. The sidebands are offset from the carrier fCW by the oscillation frequency fOSC, as illustrated in FIG. 3.

According to an aspect of the invention the reader 11 may be arranged to detect the value of the sensed quantity based on the instantaneous oscillation frequency fOSC. For example, a frequency fOSC acquisition entity 405 may be provided to derive the fOSC or a parameter representing it from the received backscattered signal. This information may be provided further to the control section 41 as illustrated by a signal 416. The entity 405 may optionally derive and provide further information regarding the received back-scattered signal, such as a received signal level, a signal/noise ratio (SNR) of the received signal, etc. The fOSC acquisition entity may, for example, comprise a down-mixer in which the received signal fCW±fOSC is mixed with the carrier fCW so that an oscillation frequency signal fOSC is obtained. The frequency $f_{offset}$ may then be measured with a suitable manner, e.g. with a frequency counting method. The fOSC may also be detected directly from the received signal, e.g. by determining the phase shift between fCW and fCW±fOSC, the phase shift being proportional to the oscillation frequency between fOSC. The received signal level can be determined with any suitable signal level detector. Signal level information is already available in many commercial RFID readers According to an aspect of the invention, the reader 11 is arranged to convert the sensor frequency modulation response of a sensor tag to a measurement value in sensor element-specific manner, e.g. based on sensor element-specific configuration information. The control section 41 may use the frequency-related information to derive the actual value of the sensed quantity. The control section 41 may have further information about the wireless sensor in question e.g. sensor elements available in the sensor tag, time needed to interrogate each of the sensor elements, etc. (also referred to as node configuration information), in order to, for example, convert this information into an actual value of the sensed quantity, make calibration operations, make calculations, etc.

The communication interface enables the reader 11 to communicate with upper level systems, such as a host computer or a software application 43, using appropriate connections and appropriate protocols, such as OPC (OLE (object linking and embedding) for Process Control). For example, the reader may be physically connected to a host computer using a serial connection, such as the RS-228 or USB serial connection. As another example, the reader may be connected to the host computer 43 via a wired or wireless network, whereby the reader behaves like a standard network device and do not require particular knowledge of the hardware and system configuration. The RFID readers may support multiple network protocols such as Ethernet, TCP/IP, UDP/IP, HTTP, LAN, WLAN and others. The host 43 may generally serve two main functions. First, it is receiving data from the readers and performing data processing such as filtering and collation. Secondly, it serves as a device monitor, making sure the reader is functioning properly, securely and with up to date instructions. An RFID reader may further comprise a power supply 44. The power supply 44 may be an appropriate AC/DC adapter connected to a power network, or a battery power source, for example.

Alternatively, the reader may be powered over a communication network connection, such as Ethernet or USB.

Using a passive wireless sensor according to the first aspect of the invention and optionally a reader according to the second aspect of the invention, the reading distance of passive wireless sensors can be increased up to several meters, to a room scale. The increased reading distance makes it possible to read multiple passive wireless sensors (located within the increased reading range) with one and same reader. The multiple wireless sensors can have different types of sensing elements, different reading cycles, different sensor value formats/ranges, different temperature compensation arrangements, different calibration arrangements, or other sensor-specific parameters, characteristics or configurations. There can also be several sensor elements with different configurations and parameters in a single passive wireless sensor. Although the UHF RFID technology (such as the standard Class-1 Gen-2 anti-collision), for example, has tackled most of the issues concerning reading of multiple wireless tags, there is a need to provide methods, routines and arrangements for managing and reading multiple passive wireless sensors having different sensor characteristics.

During each interrogation, the reader 11 may send an RF interrogation message the sensor tag 10 provided with a sensing element 28 and receives a backscattered reply signal fCW±fOSC from the sensor 10. The reader 11 may be arranged to detect the value v of the sensed quantity based on the instantaneous oscillation frequency fOSC and store the sensor value. For example, a frequency fOSC acquisition entity 405 may derive the fOSC or a parameter representing it from the received backscattered signal, and forward it further to the control section 41 which may store it in the memory 412, as described with reference to FIG. 4. Thus, each interrogation n of the sensor, wherein n=1, 2, 3, 4, . . . , N, may produce one sensor value $v_n$ for that sensor element, such that the reader will store a sequence of sensor values . . . , $v_{n-1}$, $v_n$, $v_{n+1}$, . . . , for each sensor around. The sensor elements are interrogated alternately one at time (a time multiplexing) but their interrogating rates may differ significantly from each other.

Interrogating or reading passive RFID sensors requires "on-air" time for powering the sensor. The time needed can be very short, such as 2-3 ms, or relatively long, such as 10-50 ms, depending on the sensor used. It is also important to note that the radio frequency signal power received at the tag and the power of the backscattered signal received at the reader falls rapidly with the distance between the reader and the tag. Therefore, the time required for powering the sensor may increase with the distance unless the transmission power of the reader is increased correspondingly. Moreover, the maximum allowed EIRP (equivalent isotropic radiated power), which determines the power of the signal transmitted by the reader in the direction of the tag, is typically limited by national regulations (e.g. in North America it is 4 W). In any case the power of the backscattered signal at the receiver is decreased with distance, which will increase the error rate. Further, due to a nature of wireless communication, there is constant sporadic noise affecting to the interrogation events.

The radio bandwidth available for RFID communication is not unlimited but actually very scarce. If multiple sensors must be interrogated very often, there is more radio noise within the RFID spectrum. If a sensor can be interrogated less often, e.g. the interrogation rate R of a sensor, (the number of interrogations per time unit) is decreased, more radio spectrum is freed to other readers and sensors for communication. An interrogation cycle IC=1/R is the time duration from a start of an interrogation to a start of the next interrogation.

It is difficult to determine the minimum interrogation rate or cycle needed to keep the required sensor values up to date. In a control system, wherein the passive RFID sensor tag 10 may be a part of a control loop, the minimum interrogation cycle will be the required control cycle, but in most cases the reading is done more often.

According to an aspect of the invention, the interrogation rate is controlled based on a statistical analysis of the received sensor values in the reader. The interrogation rate may be at least temporally changed if the statistical analysis indicates that the received sensor value is obviously erroneous. This approach filters out sensor readings which are obviously defective.

Figure 5:
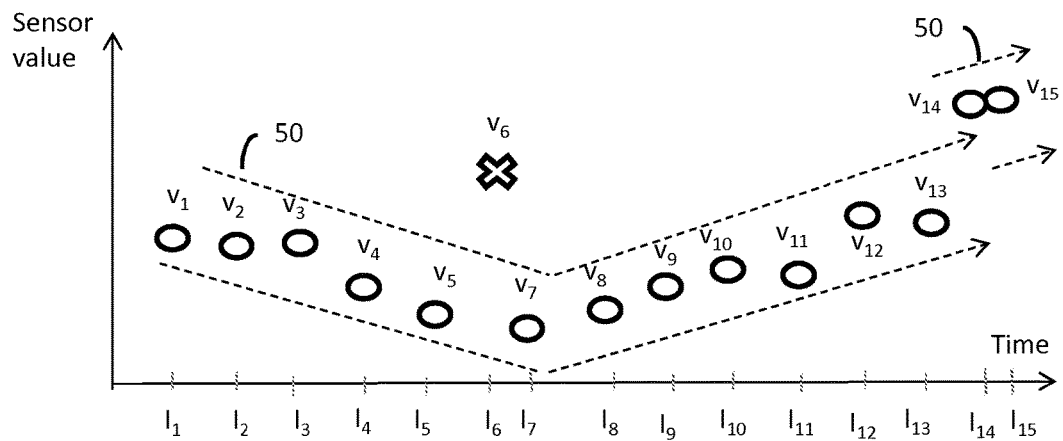
FIG. 5 is a graph illustrating received sensor values $v_1$, $v_2$, ..., $v_{15}$ for fifteen consecutive interrogations $I_1$, $I_2$, ..., $I_{15}$ for one sensor.
Figure 6:
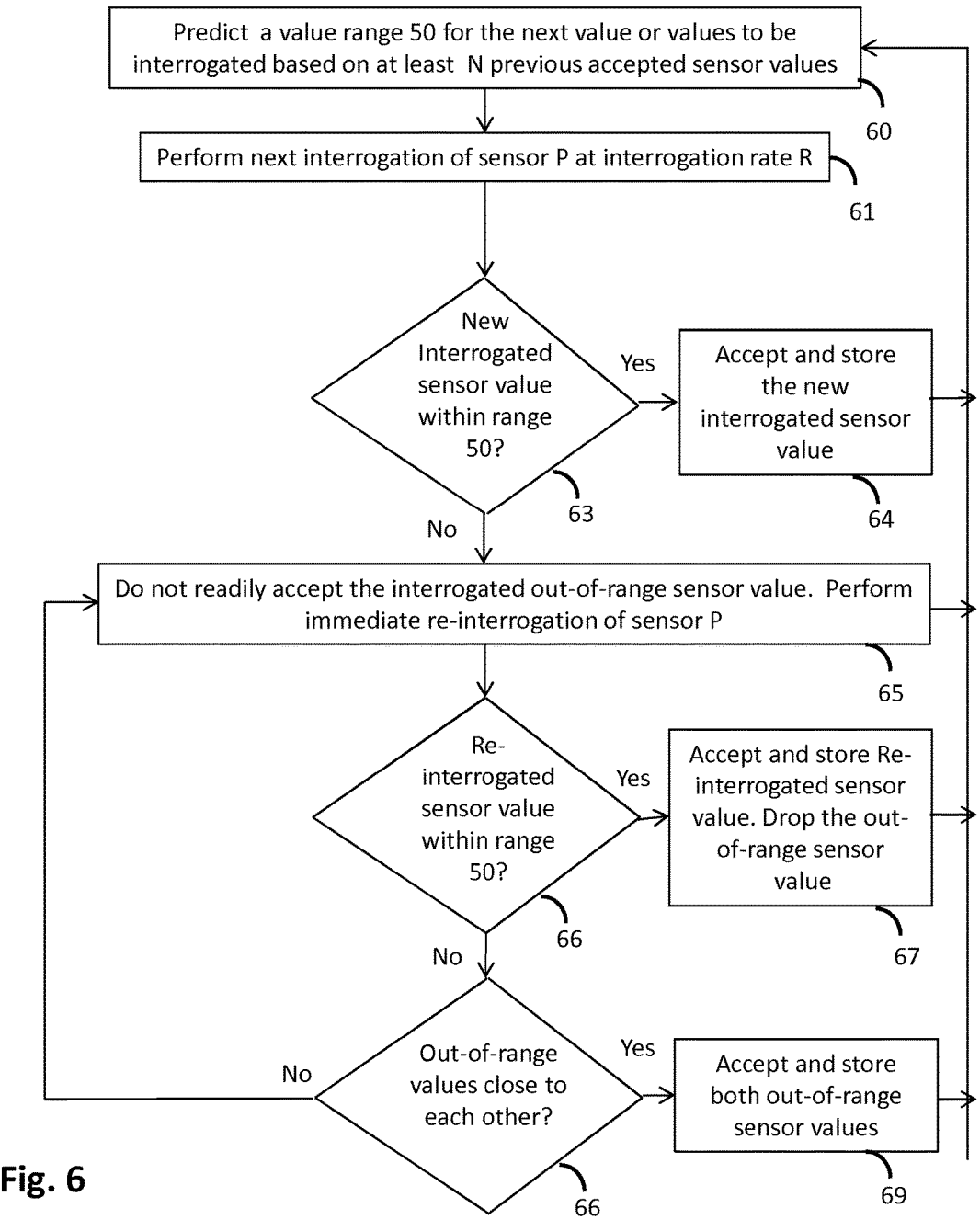
FIG. 6 illustrates a flow diagram illustrating an exemplary control procedure for an interrogation rate.

An example of controlling an interrogation rate based on a statistical analysis of the received sensor values is illustrated in FIGS. 5 and 6. FIG. 5 illustrates received sensor values $v_1$, $v_2$, . . . , $v_{15}$ for fifteen consecutive interrogations $I_1$, $I_2$, . . . , $I_{15}$ for one specific sensor. Similar presentation can be made for each sensor within an interrogation range. The sensor elements are interrogated alternately one at time (a time multiplexing) but their interrogating rates may differ significantly from each other. FIG. 6 illustrates a flow diagram illustrating the exemplary control procedure for one specific sensor. Similar control procedure may be carried out separately for each sensor around.

In the beginning the reader 11 may store N values of previous interrogated sensor values from all sensors within the reading range of the reader 11. The number N of stored values can be a selectable parameter and different for different sensors, but an accuracy of the prediction is better if a higher number, preferably at least 10-20, of the last interrogated sensor values is stored. On basis of these N previous sensor values a value range 50 for the next value or values to be interrogated is predicted for the sensor (step 60 in FIG. 6). Similarly, a respective value range 50 may be predicted separately for each sensor around. For example, the value range 50 may be predicted by predicting the next sensor value(s) and a tolerance allowed for the sensor value. The prediction 50 of a specific sensor may be updated each time a new interrogated sensor value from a respective is accepted and stored, such that the prediction may adapt to gradually changing sensor values. The prediction may be performed by an extrapolation, an interpolation, a linear regression, etc. of the stored values. The tolerance may be defined by a variance or a similar statistical value.

In the interrogation $I_1$ a next sensor value $v_1$ is obtained from the sensor (step 61 in FIG. 6). The reader 11 may check whether this next interrogated sensor value $v_1$ from a specific sensor falls within the predicted value range 50 of that sensor (step 63 in FIG. 6). As the interrogated value $v_1$ is within the predicted value range 50, the integrated value $v_1$ is accepted and stored (step 64 in FIG. 6), and the predicted value range 50 of the sensor is updated with the new sensor value $v_1$ (step 60 in FIG. 6). The interrogation rate R of the sensor may be maintained unchanged. Also the next interrogations $I_2$, $I_3$, $I_4$, $I_5$ provide interrogated values $v_2$, $v_3$, $v_4$, $v_5$ which fall within the predicted sensor value range 50, and thereby the same procedure is repeated (steps 60-64 in FIG. 6). The predicted sensor value range 50 adapts to the gradually falling sensor values, as illustrated in FIG. 5.

In the interrogation $I_6$ the interrogated sensor value $v_6$ from the sensor is not within the predicted range 50 of the sensor P. As a result the interrogated sensor value $v_6$ is not readily accepted, but an immediate reinterrogation $I_7$ of the sensor may be made to obtain a new interrogated sensor value $v_7$ for comparison (step 65 in FIG. 6). Thus the interrogation rate R of the sensor is temporarily increased. As this new interrogated value $v_7$ is within the predicted range 50, the new interrogated sensor value $v_7$ may be accepted and stored, and the previous out-of-range interrogated sensor value $v_6$ may be dropped (step 67 in FIG. 6). The predicted value range 50 of the sensor may be updated with the new sensor value $v_7$ (step 60 in FIG. 6). The allowed tolerance or deviation of the predicted sensor value may be fixed or dynamically adjusted. For example, the tolerance may a statistical parameter, such as a variance of the N last stored sensor values.

Also the next interrogations $I_8, I_9, I_{10}, I_{12}, I_{13}$ provide interrogated values $v_8, v_9, v_{10}, v_{11}, v_{12}, v_{13}$ which fall within the predicted sensor value range 50, and thereby the same procedure is repeated (steps 60-64 in FIG. 6). The predicted sensor value range 50 adapts to the gradually increasing sensor values but the interrogation rate R of the sensor may be maintained unchanged.

In the interrogation $I_{14}$ the interrogated sensor value $v_{14}$ from the sensor is not within the predicted range 50 of the sensor (step 63 in FIG. 6). As a result the interrogated sensor value $v_{14}$ is not readily accepted, but an immediate re-interrogation $I_{15}$ of the sensor may be made to obtain a new interrogated sensor value $v_{15}$ for comparison (step 65 in FIG. 6). Thus the interrogation rate R of the sensor is temporarily increased. However, now even the new immediately re-interrogated sensor value $v_{15}$ is out of the predicted sensor value range 50 (step 66 in FIG. 6). On the other hand, the new interrogated sensor value $v_{15}$ is relatively close to the previous interrogated out-of-range sensor value $v_{15}$ (e.g. within a tolerance) (step 68 in FIG. 6), the reader 11 may assume that there is a real change in the sensed pressure values. Thus, both the previous out-of-range interrogated sensor value $v_{14}$ and the new out-of-range interrogated sensor value $v_{15}$ may be accepted and stored (step 69 in FIG. 6). The predicted sensor value range 50 is step-wise adapted to the large rapid change of the sensor values (step 60 in FIG. 6).

If in step 68, both the new immediately re-interrogated sensor value $v_n$ and the last previous interrogated sensor value $v_{n-1}$ are out of the predicted sensor value range and relatively far apart from each other (e.g. not within a tolerance), neither of the previous out-of-range interrogated sensor values $v_n$ and $v_{n-1}$ is immediately accepted but a further immediate re-interrogation of the sensor may be made to obtain a new interrogated sensor value $v_{n+1}$ for comparison (step 65 in FIG. 6). New re-interrogations may be done (steps 65, 66, 68) until a stable situation is achieved, e.g. two or more consecutive sensor values fall within the predicted sensor value range 50 (steps 66, 67) or are out-of-range values close enough each to other to be accepted as valid sensor values (steps 68, 69). Thus, the interrogation rate R of the sensor may be maintained increased until a good situation is found, and the interrogation rate R may then be decreased to a normal value (procedure returns to step 60).

Figure 7:
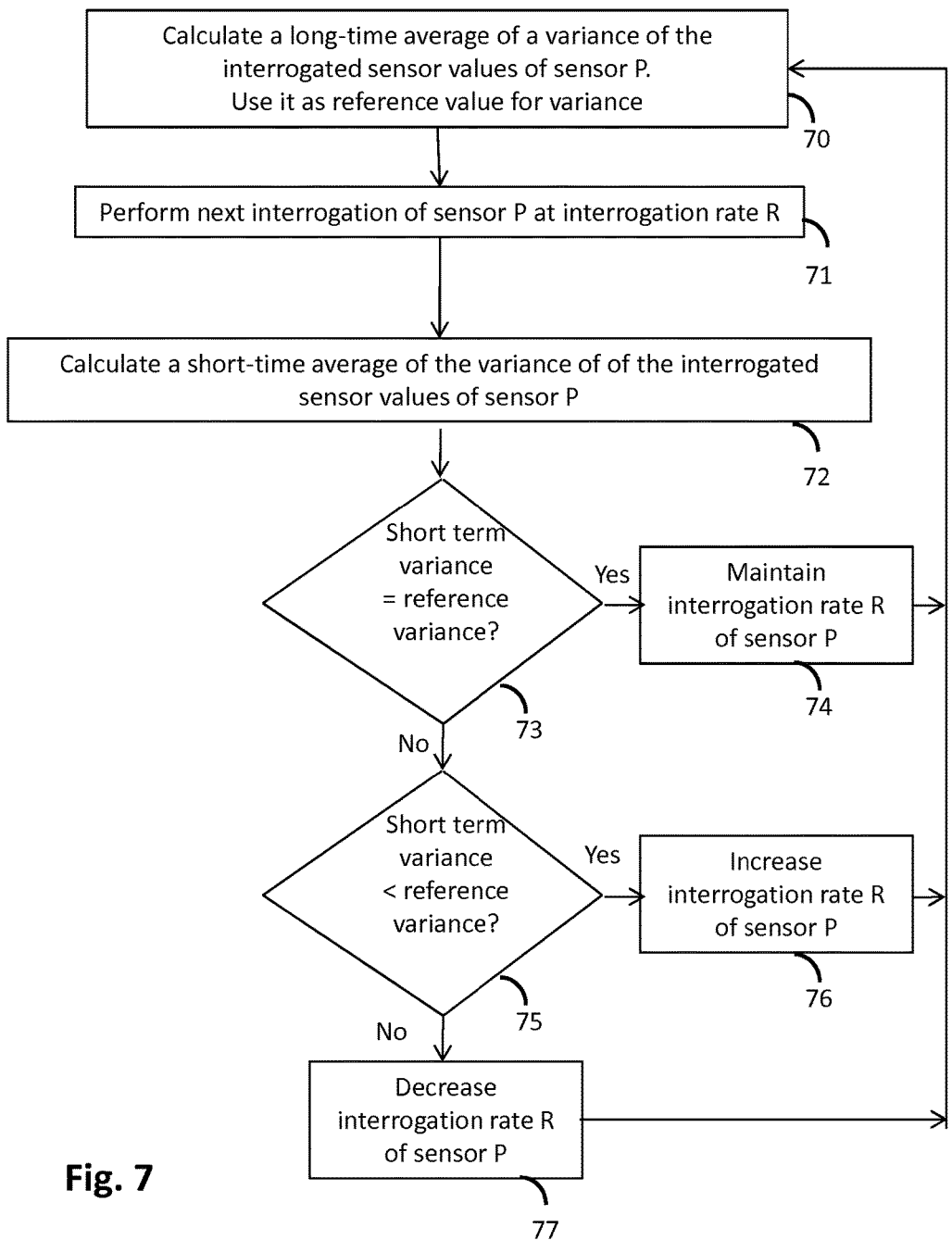
FIG. 7 is a flow diagram illustrating another exemplary control procedure for an interrogation rate.

FIG. 7 illustrates a flow diagram illustrating another exemplary control procedure for one specific sensor. Similar control procedure may be carried out separately for each sensor around. In this example the statistical criterion is a variance of the interrogated sensor values.

In the beginning the reader 11 may store at least N values of previous interrogated sensor values from all sensors within the reading range of the reader 11. On basis of these N previous sensor values a long-time average of the variance of the interrogated sensor values is calculated for the sensor (step 70 in FIG. 7). This long-time average is used as a reference value for variance in the control procedure. Similarly, a respective long-time average of the variance may be calculated separately for each sensor around. The long-time average of a specific sensor may be updated each time a new interrogated sensor value from a respective is accepted and stored, such that the average may adapt to gradually changing sensor values.

Next interrogation is performed for the sensor at an interrogation rate R (step 71 in FIG. 7). The short-time average of the variance of the sensor may be calculated each time a new interrogated sensor value is accepted and stored (step 72 in FIG. 7). The short term variance may be calculated over a low number of previous interrogated sensor values. If the short-time average is substantially equal to the long-time reference variance (step 73 in FIG. 7), the present interrogation rate R of the sensor is maintained (step 74 in FIG. 7) and the procedure may return to step 70. If the short-time average is not substantially equal to the long-time reference variance (step 73 in FIG. 7), it may be checked whether the short-time average is smaller or larger than the long-time reference variance (step 75 in FIG. 7). If the short-time average is smaller than the long-time reference variance, the interrogation rate R of the sensor may be increased (step 76 in FIG. 7) and the procedure may return to step 70. If the short-time average is larger than the long-time reference variance, the interrogation rate R of the sensor may be decreased (step 77 in FIG. 7) and the procedure may return to step 70.

Figure 8A:
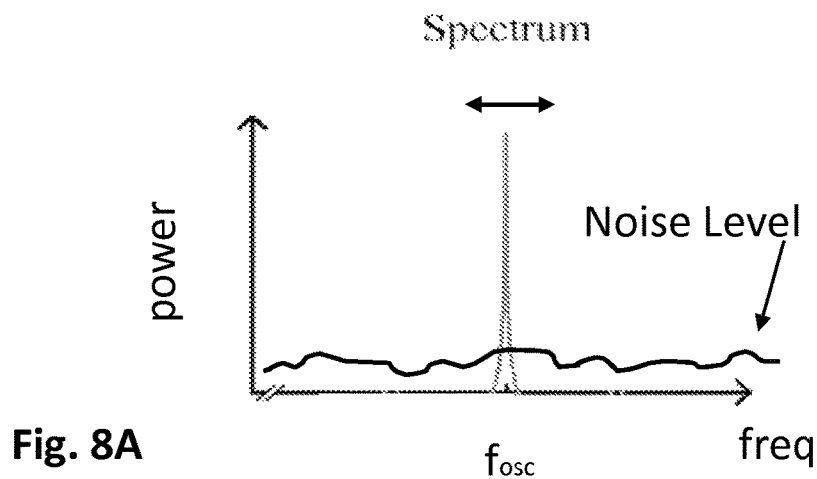
FIG. 8A is a graph illustrating an acceptable signal-noise-ratio (SNR) of the received signal.
Figure 8B:
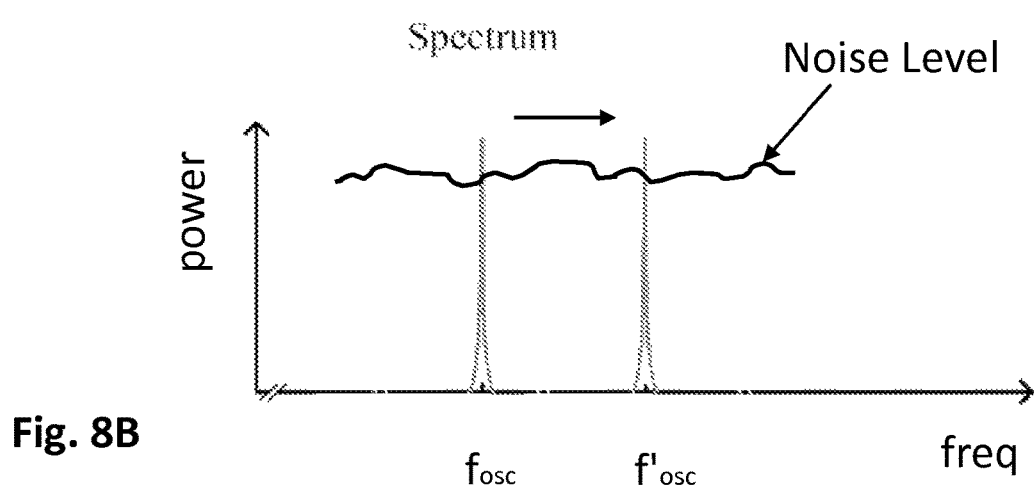
FIG. 8B is a graph illustrating an unacceptable low signal-noise-ratio (SNR) of the received signal.
Figure 8C:
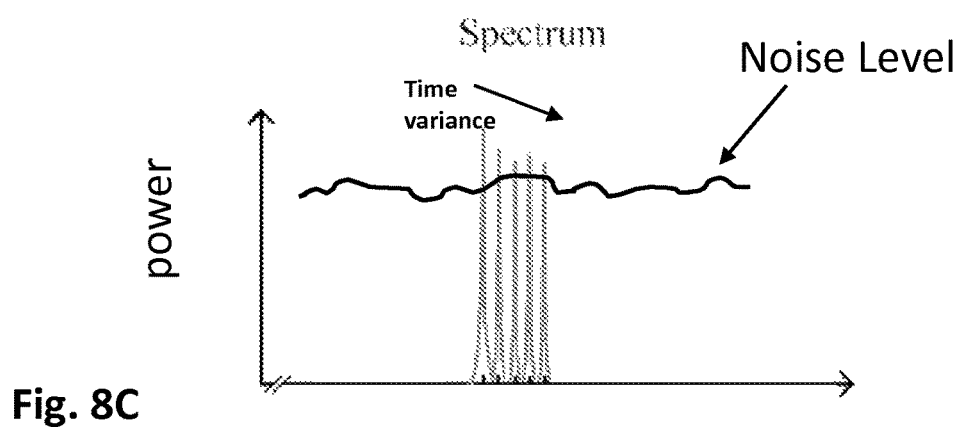
FIG. 8C is a graph illustrating the time variance of a low signal-noise-ratio (SNR) of the received signal.

The above-illustrated exemplary embodiments for methods of controlling an interrogation rate based on a statistical analysis of the received sensor values method work fine, if we assume that signal-noise-ratio (SNR) of the received backscattered signal is acceptable, i.e. there is no inaccuracy in the sensed values due to a poor SNR. An acceptable signal-noise-ratio (SNR) of the received signal fOSC is illustrated in FIG. 8A. The signal power at the frequency fOSC is well above the noise level. When signal-noise-ratio (SNR) of the received signal fOSC is low, i.e. not acceptable, the signal power at the frequency fOSC is close to the noise level, and the noise may produce some shift or error in the detected oscillation frequency fOSC, e.g. a frequency f'osc may be detected instead of the correct frequency fOSC, as illustrated in FIG. 8B. The frequency shifts due to the unacceptable low SNR may also vary with time as illustrated in FIG. 8C. Such shifts in the detected oscillation frequency due to a low SNR may cause the reader 11 to interpret similar shift or change in the detected sensor values, although there is no corresponding change in the actual sensor value measured by the sensing element in the sensor tag 10. Moreover, due to the poor SNR, the reader 11 may perform the calculation of a predicted value range using inaccurate sensor values in the statistical operations, which may lead to an incorrect predicted value range.

Figure 9A:
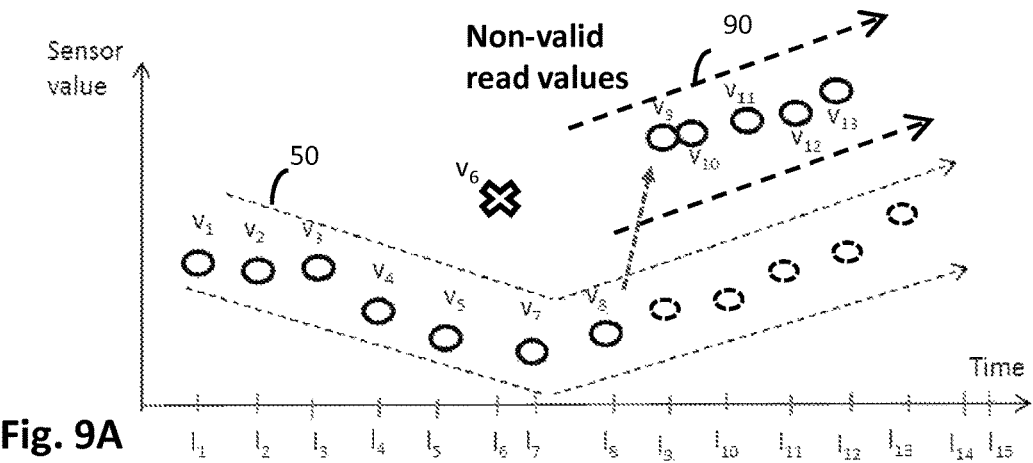
FIG. 9A is a graph illustrating the effect of calculation of a wrong predicted value range based on the inaccurate sensor values due to an unacceptable low signal-noise-ratio (SNR)

Let us assume that in the example illustrated in FIG. 5, the sensor values v9-v13 would have been received when the SNR is not acceptable and frequency shift occurs as illustrated in FIG. 9A. Under acceptable SNR conditions, the sensor values v9-v13 fall within the predicted value range 50 of the sensor, as illustrated by dotted circles in FIG. 9A. However, under unacceptable SNR conditions, the interrogated sensor value v9 does not fall within the predicted value range 50. Also the re-interrogated value v10 falls outside the predicted value range 50 but is relatively close to the previous out-of-range sensor value v10, and both values are readily accepted despite SNR is not acceptable. This situation may lead the reader to accept non-valid values as valid sensor values and it may also lead the reader to calculate wrong predicted value ranges, following wrong path. For example, in FIG. 9A, a wrong predicted value range 90 is formed, as also the following interrogated sensor values v11-v13 are shifted close to the previous out-of-range values. Thus, erroneous sensor values will be systematically accepted. A shift of a single sensor value, e.g. v6, due to a spurious noise or interference will be filtered out by the statistical analysis.

Figure 9B:
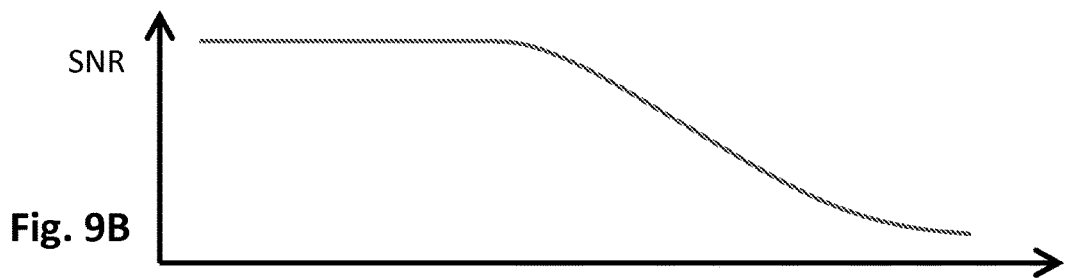
FIGS. 9B and 9C are graphs illustrating a gradual change of the SNR with time and a corresponding gradual change in the sensor values.
Figure 9C:
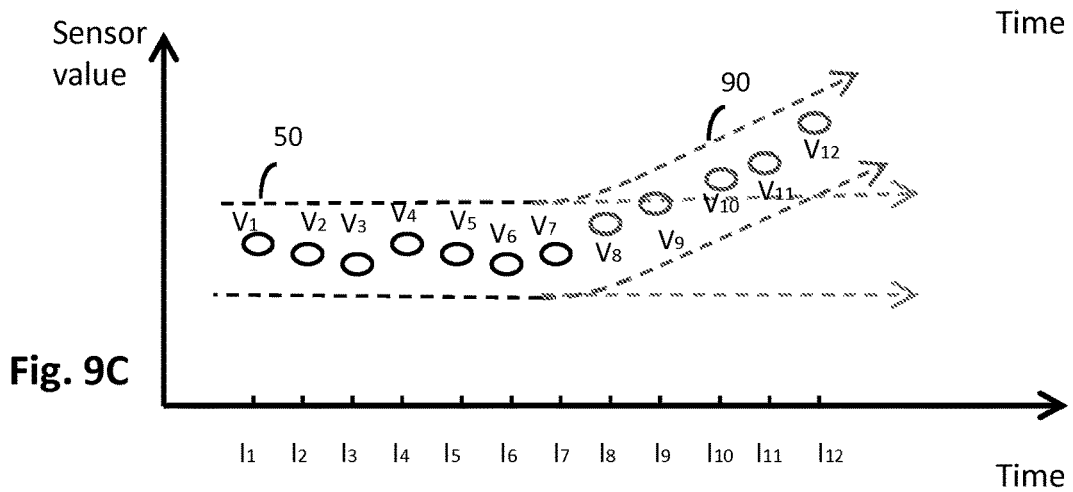

As another example, FIGS. 9B and 9C illustrate a gradual change of the SNR with time and a corresponding gradual change in the sensor values v1-v10. During an acceptable SNR, accurate sensor values v1-v7 are detected and the predicted value range 50 is calculated correctly. However, when the SNR gradually changes more and more lower, the sensor values v8-v12 gradually become more and more inaccurate, and also the predicted value range 90 calculated based on the incorrect values gradually departs from the predicted value range 50 that would have been calculated based on correct sensor values detected during acceptable SNR condition.

According to a still another aspect of the invention a statistical control of the interrogation rate R based on the interrogated sensor values made in parallel with or in combination with an interrogation power control arranged to reduce the inaccuracy of the interrogated sensor values possibly caused by the signal-noise-ratio (SNR) of the received backscattered signal.

Figure 10:
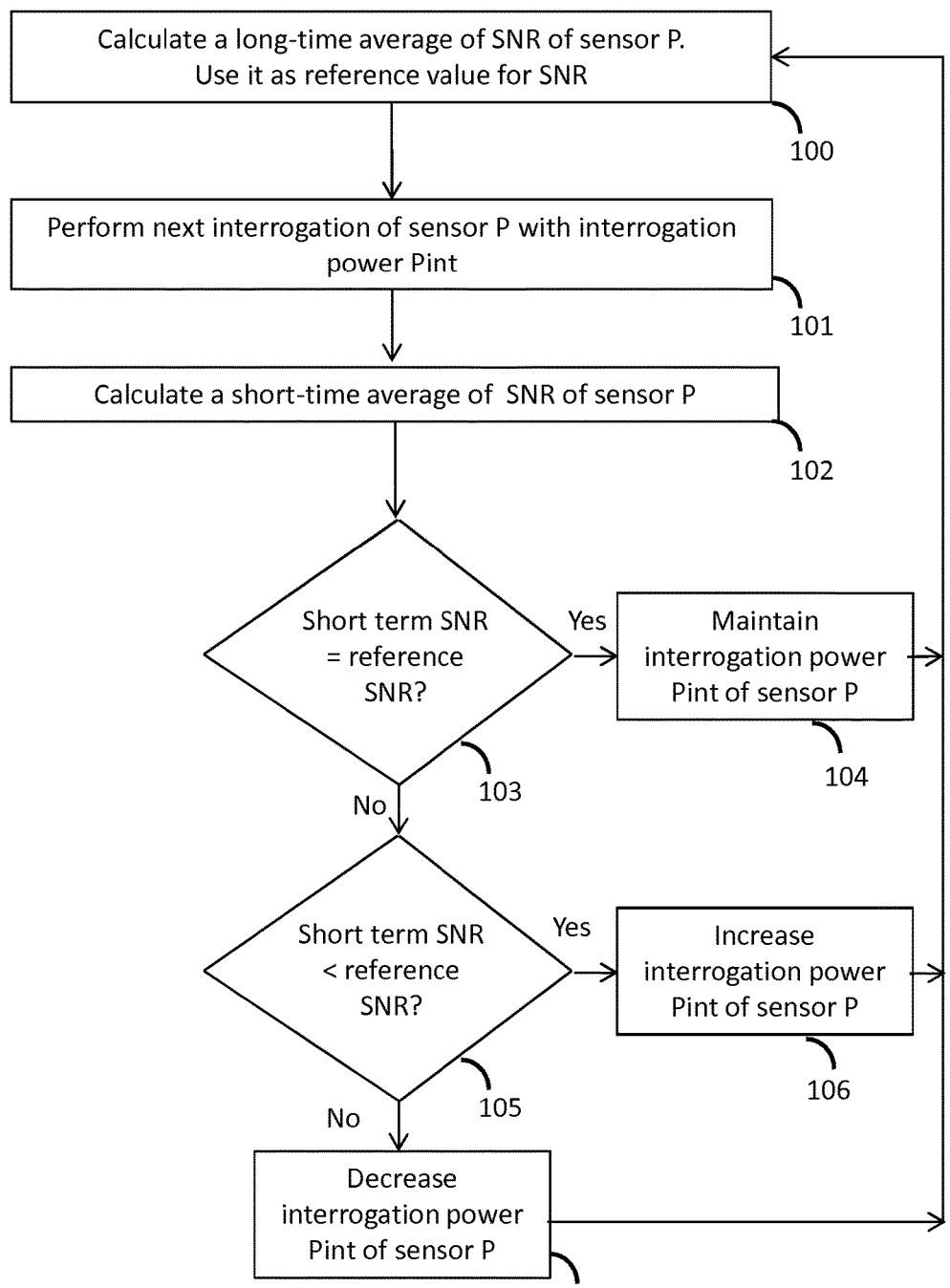
FIG. 10 is a flow diagram illustrating an exemplary control procedure for an interrogation power.

FIG. 10 illustrates a flow diagram illustrating a statistical control of the interrogation power Pint that may be performed in parallel with a statistical control of the interrogation rate R. The exemplary power control procedure is illustrated for one specific sensor. Similar control procedure may be carried out separately for each sensor around. In this exemplary power control procedure the statistical criterion is a long-time average of signal/noise ratio (SNR) of the backscattered signal during interrogation of a specific sensor, and the interrogation power is controlled. The instantaneous SNR values can be measured by an RF front end 60 of the reader 11, e.g. by an RX level detection unit 405, and provided to the digital control 41 for the control procedure.

In the beginning the reader 11 may store SNR values of at least N previous interrogations from each sensor within the reading range of the reader 11. On basis of these N previous SNR values a long-time average of the SNR is calculated for the sensor (step 100 in FIG. 10). This long-time average is used as a reference value for the SNR in the control procedure. Similarly, a respective long-time average of the SNR may be calculated separately for each sensor around. The long-time average SNR of a specific sensor may be updated each time a new interrogated sensor value from a respective is accepted and stored, such that the average may adapt to gradually changing radio conditions, e.g. to changing distance.

Next interrogation is performed for the sensor with a transmitted interrogation power Pint (step 101 in FIG. 10). A short-time average of the SNR of the sensor may be calculated each time a new interrogated sensor value is accepted and stored (step 102 in FIG. 10). The short-time SNR may be calculated over a low number of previous interrogations. If the short-time average SNR is substantially equal to the long-time reference SNR (step 103 in FIG. 10), the present interrogation power Pint is maintained for of the sensor (step 104 in FIG. 10) and the procedure may return to step 100. If the short-time average SNR is not substantially equal to the long-time reference SNR (step 103 in FIG. 10), it may be checked whether the short-time average SNR is smaller or larger than the long-time reference SNR (step 105 in FIG. 10). If the short-time average SNR is smaller than the long-time reference SNR, the interrogation power Pint for the sensor may be increased (step 106 in FIG. 10) and the procedure may return to step 100. If the short-time average SNR is larger than the long-time reference SNR, the interrogation power Pint for the sensor may be decreased (step 107 in FIG. 10) and the procedure may return to step 100.

According to a still another aspect of the invention a statistical control of the interrogation rate R and a statistical control of the interrogation power Pint may be combined. For example, the controls may be combined such that the interrogation power control is a primary control and the interrogation rate control is a secondary control. Thus, the quality of the received sensor data may be first attempted to improve with the interrogation power control, and the interrogation rate control is attempted if the interrogation power control is not possible or effective, e.g. the maximum allowed EIRP is reached. This approach may allow low interrogation rates and thereby more interrogated sensors. As another example, the controls may be combined such that the interrogation rate control is a primary control and the interrogation power control is a secondary control. Thus, the quality of the received sensor data may be first attempted to improve with the interrogation rate control, and the interrogation power control is attempted if the interrogation rate control is not possible or effective, e.g. the interrogation rate cannot be increased without decreasing the number of interrogated sensors. This approach may allow lower interrogation powers and lower radio interference.

Figure 11:
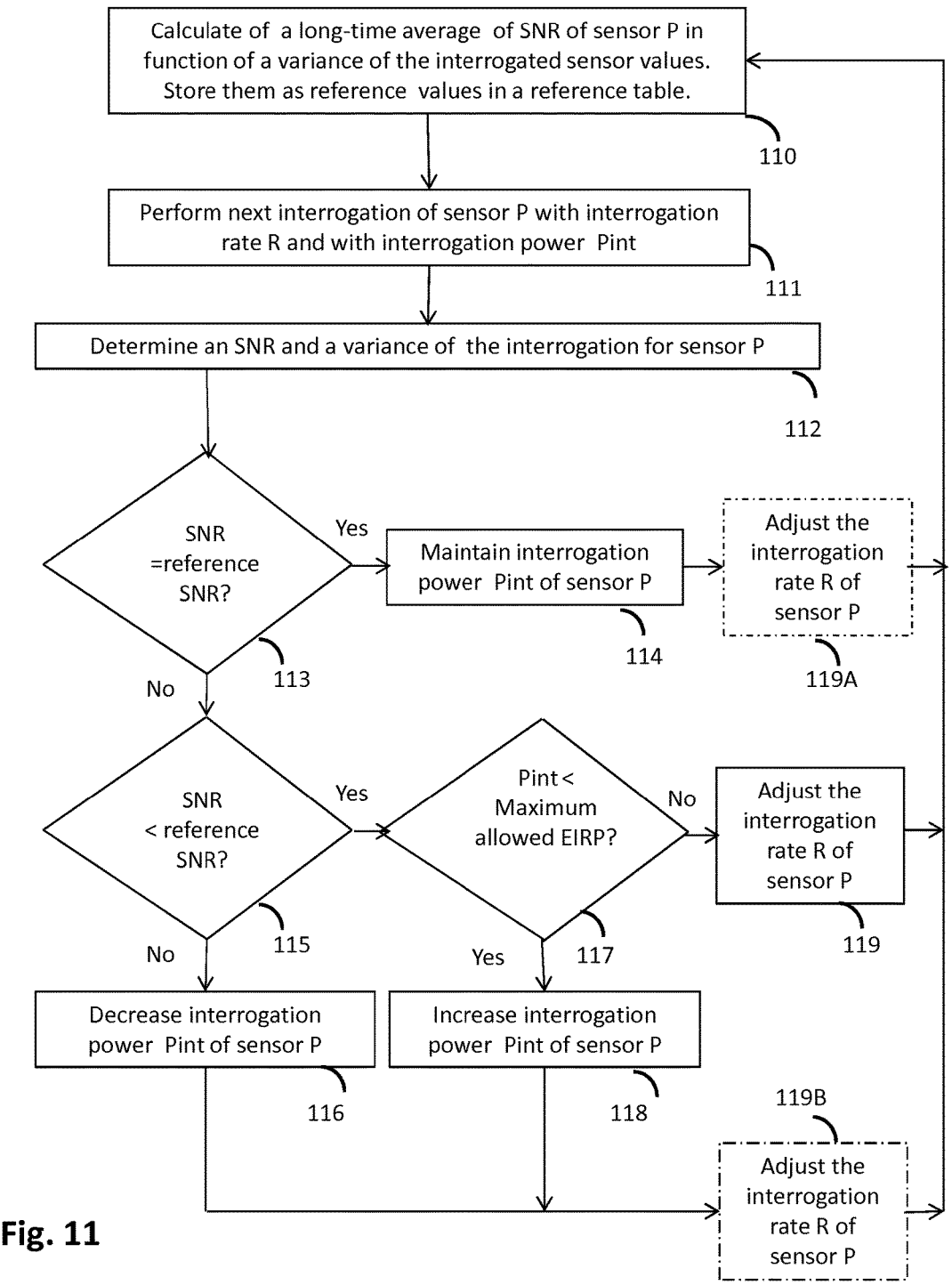
FIG. 11 is a flow diagram illustrating still an exemplary combined control procedure wherein both the interrogation power and the interrogation rate are controlled.

FIG. 11 illustrates a flow diagram illustrating still an exemplary combined control procedure for one specific sensor. Similar control procedure may be carried out separately for each sensor around. In this example the statistical criteria are a long-time average of signal/noise ratio (SNR) of the backscattered signal during interrogation of a specific sensor as well as a long-time average of variance of the interrogated sensor values, and both the interrogation power and the interrogation rate are controlled. The instantaneous SNR values can be measured by an RF front end 50 of the reader 11, e.g. by an RX level detection unit 405, and provided to the digital control 41 for the control procedure.

In the beginning the reader 11 may store SNR values of at least N previous interrogations from each sensor within the reading range of the reader 11 in function of a variance of the interrogated sensor values. In other words, a pair of SNR and variance may be stored for each interrogation. On basis of these N previous SNR values a long-time average of the SNR in a in function of variance of the interrogated sensor values may be calculated for the sensor (step 110 in FIG. 11) and stored, e.g. in a tabular format. There may be a number of bins of variance values, each bin covering a sub-range of a total range of variance values. The long-time average SNR for a specific bin may be calculated based on the SNR values whose corresponding variance value fall within the specific bin. These long-time averages are used as reference values for the SNR in the control procedure. Similarly, respective long-time averages of the SNR may be calculated separately for each sensor around. The long-time averages SNR of a specific sensor may be updated each time a new interrogated sensor value from a respective is accepted and stored, such that the averages may adapt to gradually changing radio conditions, e.g. to changing distance.

Next interrogation is performed for the sensor with a transmitted interrogation power Pint and with interrogation rate R (step 111 in FIG. 11). A An SNR and a variance of the interrogation are measured or calculated (step 112 in FIG. 11). If SNR of the interrogation is substantially equal to the long-time reference SNR corresponding to the variance of the interrogation (step 113 in FIG. 11), the present interrogation power Pint (and optionally present interrogation rate) is maintained for the sensor (step 114 in FIG. 11) and the procedure may return to step 110. If the SNR of the interrogation is not substantially equal to the long-time reference SNR corresponding to the variance of the interrogation (step 113 in FIG. 11), it may be checked whether the SNR of the interrogation is smaller or larger than the long-time reference SNR corresponding to the variance of the interrogation (step 115 in FIG. 11). If the SNR of the interrogation is smaller than the long-time reference SNR corresponding to the variance of the interrogation, the interrogation power Pint for the sensor may be decreased (and optionally present interrogation rate R may be maintained) (step 116 in FIG. 11) and the procedure may return to step 110. If the SNR of the interrogation is larger than the long-time reference SNR corresponding to the variance of the interrogation and if the interrogation power Pint will not exceed the maximum allowed EIRP (step 117 in FIG. 11), the interrogation power Pint for the sensor may be increased (and optionally present interrogation rate R may be maintained) (step 118 in FIG. 11) and the procedure may return to step 110. If the SNR of the interrogation is larger than the long-time reference SNR corresponding to the variance of the interrogation and if the interrogation power Pint would exceed the maximum allowed EIRP (step 117 in FIG. 11), the interrogation power Pint for the sensor may not be changed but the interrogation rate R of the sensor is adjusted (step 119 in FIG. 11) and the procedure may return to step 110. The adjustment step 119 may increase the interrogation rate R of the sensor in order to adapt the reader to the low SNR. The adjustment step 119 may work in two directions based on an averaged variance reference. When the variance drops below its reference, the reader may decrease the interrogation rate R, and vice versa, when the variance rises above its reference, the reader may increase the interrogation rate R. The adjustment step 119 may be implemented, for example, as illustrated with reference to FIG. 9. In embodiments of an adjustment of the interrogation rate R (step 119A) may also follow the step of maintaining the interrogation power Pint such that the interrogation rate can be controlled to its reference. Instead or additionally, the adjustment of interrogation rate R (step 119B) may follow also the step decreasing (step 116) and/or the step of increasing the interrogation power Pint.

A practical problem involved with using a power management to improve the SNR is that, in practice, the interrogation power employed by the RFID reader is the maximum allowed the maximum allowed EIRP (2 W in EU and 4 W in USA) in order to achieve as long read out distance as possible. In such case, the interrogation power cannot be increased any more.

According to a still another aspect of the invention a statistical control of the interrogation rate R based on the interrogated sensor values is arranged to take into account an inaccuracy of the interrogated sensor values possibly caused by the signal-noise-ratio (SNR) of the received backscattered signal. This approach is particularly advantageous, when the interrogation power employed by the RFID reader is the maximum allowed EIRP, or the power control cannot be or is not used for some other reason. The inaccuracy caused by the SNR may be taken into account in various ways in interpretation of sensor values without departing from the scope of the invention. In an embodiment, sensor values which are potentially inaccurate due to a low SNR may be rejected. In an embodiment, sensor values which are potentially inaccurate due to a low SNR may be corrected or compensated to reduce the inaccuracy. In an embodiment, sensor values which are potentially inaccurate due to a low SNR may be excluded from the sensor values which are employed in predicting a value range for the next value or values. In an embodiment, no actions may be made due to the low SNR immediately but the sensor values may be stored with information regarding their accuracy. The accuracy information may comprise SNR related information. An upper layer application or a user may utilize the accuracy information and the optional SNR information for further processing or analysis.

Figure 12:
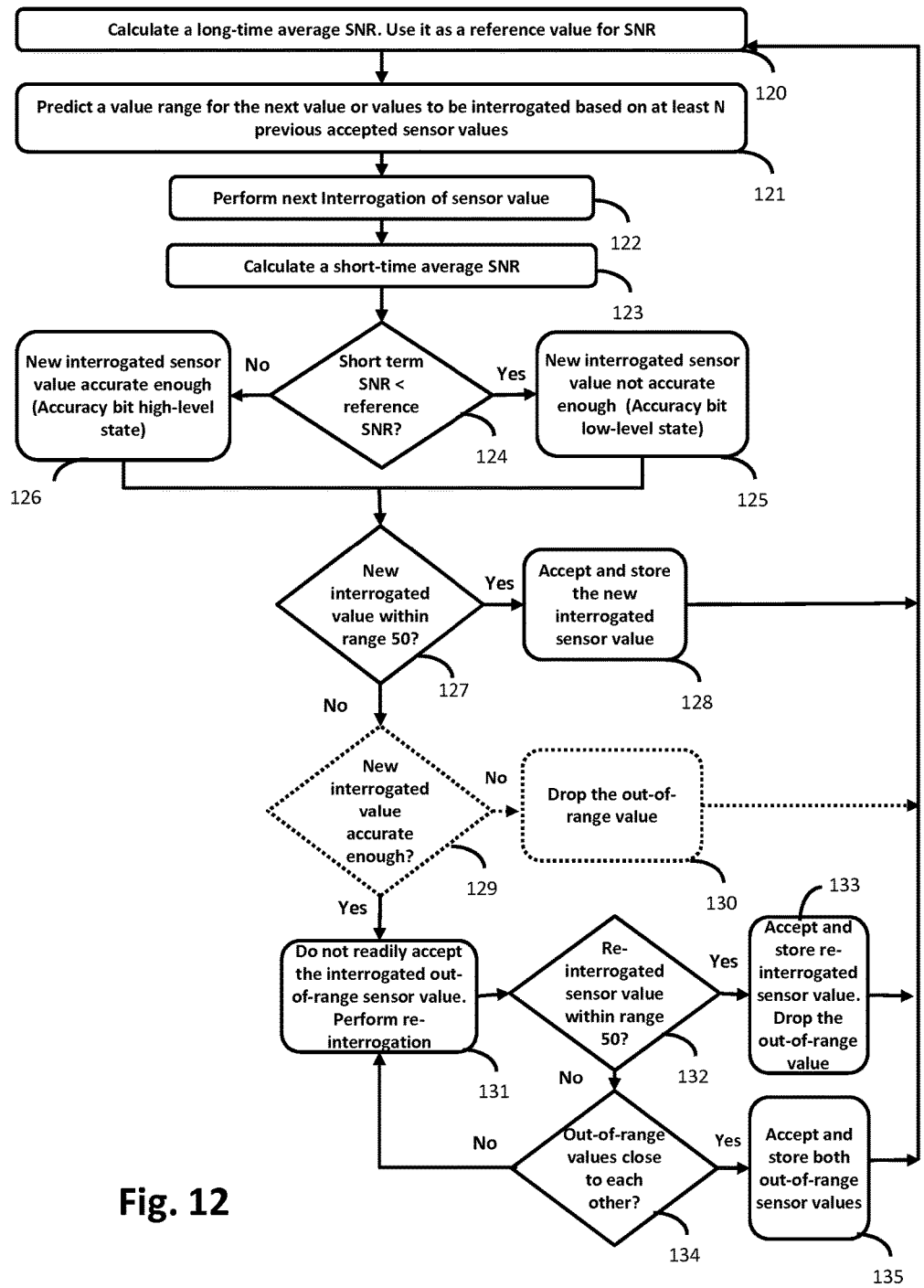
FIG. 12 is a flow diagram illustrating an exemplary control procedure wherein a statistical control of the interrogation rate R based on the interrogated sensor values is arranged to take into account an inaccuracy of the interrogated sensor values possibly caused by the signal-noise-ratio (SNR)

FIG. 12 is a flow diagram illustrating an exemplary control procedure a statistical control of the interrogation rate R based on the interrogated sensor values is arranged to take into account an inaccuracy of the interrogated sensor values possibly caused by the signal-noise-ratio (SNR) by rejecting out-of-range values. Similar control procedure may be carried out separately for each sensor around. In this example the statistical criterion is a variance of the interrogated sensor values.

In the beginning the reader 11 may store SNR values of at least N previous interrogations from each sensor within the reading range of the reader 11. On basis of these N previous SNR values a long-time average of the SNR is calculated for the sensor (step 120 in FIG. 12). This long-time average is used as a reference value for the SNR in the control procedure. Similarly, a respective long-time average of the SNR may be calculated separately for each sensor around. The long-time average SNR of a specific sensor may be updated each time a new interrogated sensor value from a respective is accepted and stored, such that the average may adapt to gradually changing radio conditions, e.g. to changing distance.

The reader 11 may also store at least N values of previous interrogated sensor values from all sensors within the reading range of the reader 11. The number N of stored values can be a selectable parameter and different for different sensors, but an accuracy of the prediction is better if a higher number, preferably at least 10-20, of the last interrogated sensor values is stored. On basis of these N previous sensor values a value range 50 for the next value or values to be interrogated is predicted for the sensor (step 121 in FIG. 12). Similarly, a respective value range 50 may be predicted separately for each sensor around. For example, the value range 50 may be predicted by predicting the next sensor value(s) and a tolerance allowed for the sensor value. The prediction 50 of a specific sensor may be updated each time a new interrogated sensor value from a respective is accepted and stored, such that the prediction may adapt to gradually changing sensor values. The prediction may be performed by an extrapolation, an interpolation, a linear regression, etc. of the stored values. The tolerance may be defined by a variance or a similar statistical value.

Next interrogation is performed for the sensor (step 122 in FIG. 12). A short-time average of the SNR of the sensor may be calculated each time a new interrogated sensor value is obtained (step 123 in FIG. 12). The short-time SNR may be calculated over a low number of previous interrogations. A short-time SNR may also be an instantaneous SNR measured or calculated for the new interrogated sensor value only.

If the short-time average SNR is smaller than the long-time reference SNR (step 124 in FIG. 12), the new interrogated sensor value is determined to be not accurate enough (i.e. inaccurate) (step 125 in FIG. 12) and the procedure proceeds to step 127. If the short-time average SNR is greater than to the long-time reference SNR (step 124 in FIG. 12), the new interrogated sensor value is determined to be accurate enough (i.e. accurate) (step 126 in FIG. 12) and the procedure proceeds to step 127.

Then reader 11 may first check whether this next interrogated sensor value from a specific sensor falls within the predicted value range 50 of that sensor (step 127 in FIG. 12). If the new interrogated value is within the predicted value range 50, the new interrogated value is accepted and stored (step 128 in FIG. 12) and the process may return to step 120.

If the new interrogated sensor value from the sensor is not within the predicted range 50 of the sensor (step 127), may proceed from step 127 to step 131.

However, in some embodiments, there may be optional steps 129 and 130 that are depicted with a dashed line. In the optional steps, if the new interrogated sensor value from the sensor is not within the predicted range 50 of the sensor (step 127), the reader 11 check whether the new interrogated value is determined to be accurate enough (step 129). If the new interrogated value is determined to be not accurate enough, the new interrogated value may be dropped as an inaccurate out-of-range value and the process may return to step 120. If the new interrogated sensor value is determined to be accurate enough, the process may proceed to step 131.

In step 131, the accurate out-of-range sensor value may not be readily accepted, but an immediate re-interrogation of the sensor may be made to obtain a new interrogated sensor value for comparison. Thus the interrogation rate R of the sensor is temporarily increased. Then the reader 11 may check whether this re-interrogated sensor value from the specific sensor falls within the predicted value range 50 of that sensor (step 132 in FIG. 12). If the re-interrogated value is within the predicted range 50, the re-interrogated sensor value may be accepted and stored, and the previous out-of-range interrogated sensor value may be dropped (step 133 in FIG. 6) and the process may return to step 120. However, if even the immediately re-interrogated sensor value is out of the predicted sensor value range 50 (step 132 in FIG. 12), the reader 11 may check whether the re-interrogated sensor value is relatively close to the previous interrogated out-of-range sensor value (e.g. within a tolerance) (step 134 in FIG. 12). If the interrogated out-of-range values are not close to each other, the process may return to step 131 to perform reinterrogation. If the interrogated out-of-range values are close to each other, both out-of-range sensor values may be accepted and stored (step 135) and the process may return to step 120.

In some embodiments, re-interrogation according to step 131 may include processing the re-interrogated sensor value in a similar manner as described for a new interrogated value with reference to steps 123-126. In other words, a short-time average of the SNR may be calculated for the reinterrogated sensor value, the re-interrogated sensor value may be determined as an accurate or inaccurate based on the SNR.

Embodiments of the invention enable to distinguish between accurate or inaccurate sensor values. Inaccurate sensor values can be compensated or corrected, immediately or in post-processing. This can be accomplished based on the SNR due to the fact that the frequency fOSC (and there by the sensed value) drifts due to the increased noise. Hence, the more there is noise, the greater is the frequency shift from the accurate value. When the reader detects a big change in the sensor values, it may be due to poor SNR (inaccurate results).

Figure 13A:
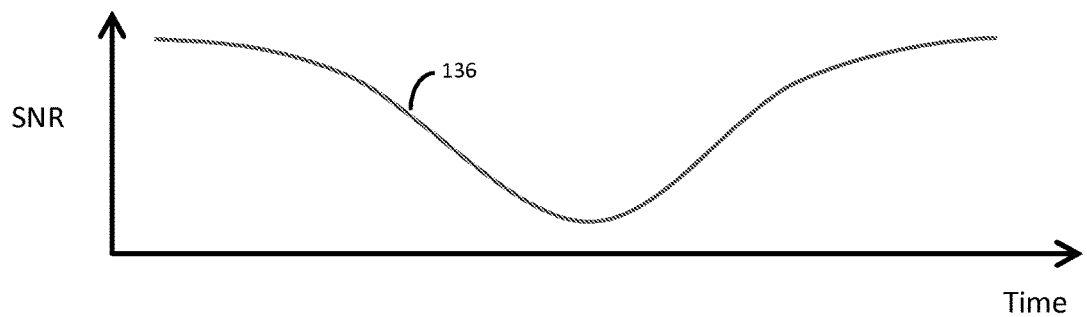
FIGS. 13A and 13B are graphs illustrating a change of the SNR with time and a corresponding SNR compensation of the inaccurate sensor values.
Figure 13B:
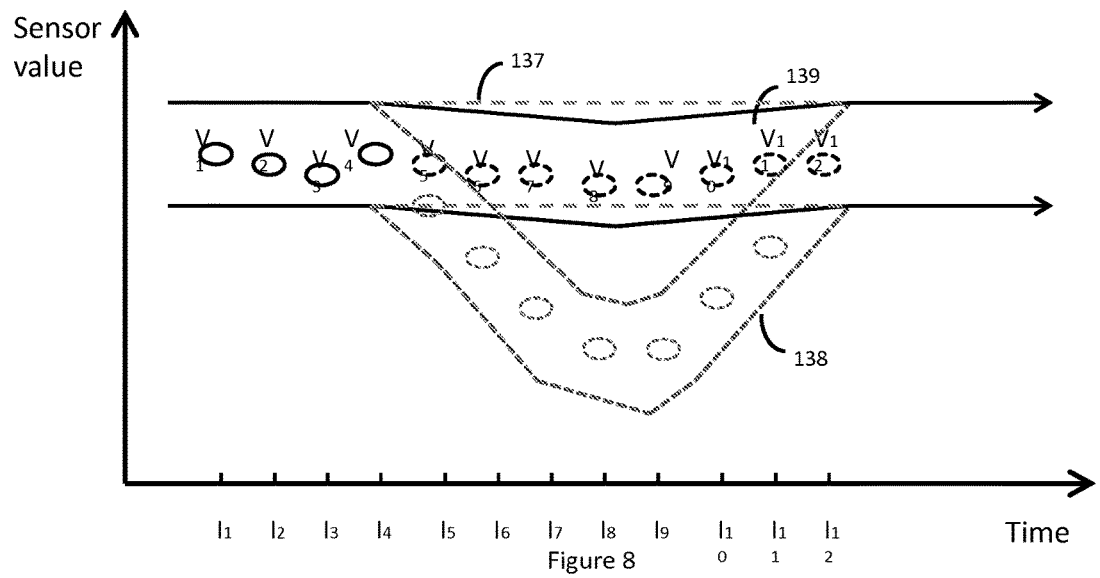
Figure 15:
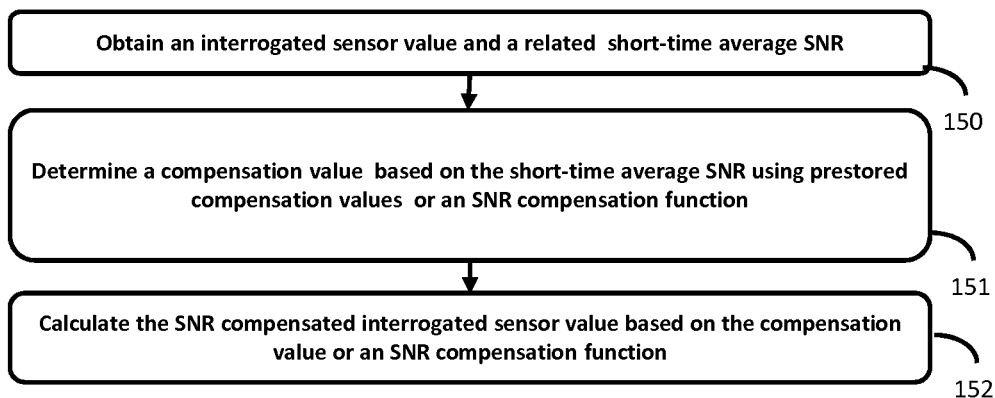
FIG. 15 is a flow diagram illustrating an exemplary method for SNR compensation of interrogated values based on the SNR.

This phenomenon is illustrated in FIGS. 13A and 13B. Let us assume that the SNR changes as depicted by curve 136 in FIG. 13A and the actual value of the sensed quantity at the sensor does not significantly change during the illustrated period of time. Thus, an accurate predicted value range should be as indicated by the dashed lines 137 in FIG. 13B. However due to the low short-time average of SNR of the backscattered signal received at the reader, it detects shifted inaccurate values and calculates an incorrect predicted value range 138 as shown by dotted lines in FIG. 13B. Compensation, based on knowledge how the short-time average of SNR effects on the sensor values v1-v12, may be applied to the inaccurate interrogated sensor values v5-v11. The resulting compensated sensor values are illustrated by dotted circles v5-v11 and a predicted value range calculated based on these compensated sensor values is illustrated by the solid lines 139. It can be seen that the compensated sensor values are closer to the actual sensed values. An exemplary compensation procedure is illustrated in FIG. 15. An interrogated sensor value and a related short-time average SNR is obtained as a result of an interrogation (step 150). The reader determines a compensation value based on the short-time average SNR, for instance by means of pre-stored compensation values or by calculating with an SNR compensation function (step 151). Then the reader calculates the SNR compensated interrogated sensor value based on the compensation value or by calculating with an SNR compensation function (step 152).

Figure 16:
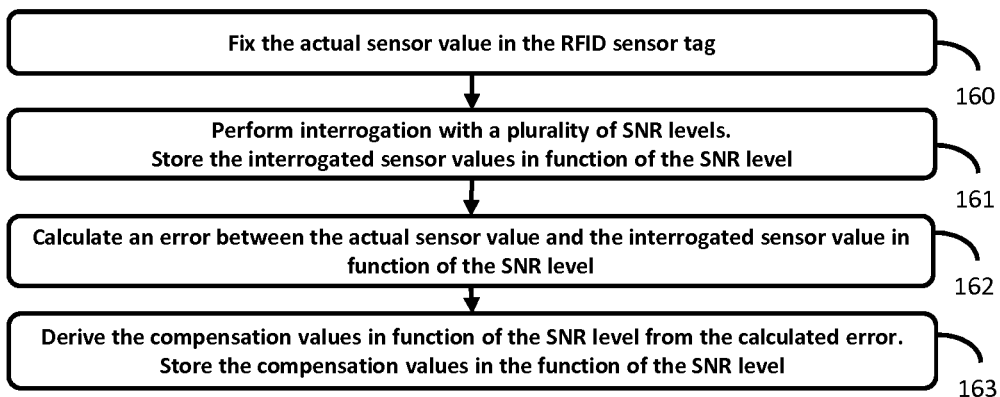
FIG. 16 is a flow diagram illustrating an exemplary method for providing SNR compensation values or an SNR compensation function.

Experiments have shown that the effect of the SNR on the interrogated sensor values can be determined or approximated in advance. For example, the effect of the SNR on the interrogated sensor values can be determined by introducing interference or noise when a sensor tag is interrogated while the actual sensor values are maintained unchanged, as illustrated in steps 160-161 in FIG. 16. Thus, the error of sensor values in function of the SNR can be determined by comparing the interrogated sensor values with the actual sensor values (step 162). This error in function of the SNR can be used to derive and store the compensation values in function of the SNR level (step 163). The amount of compensation may be determined as a calibration procedure by a manufacturer or when the sensor and reader are installed. It is also possible to derive or define a compensation function that approximates a compensation required for an RFID sensor tag, and configure the reader or other application accordingly.

Figure 14:
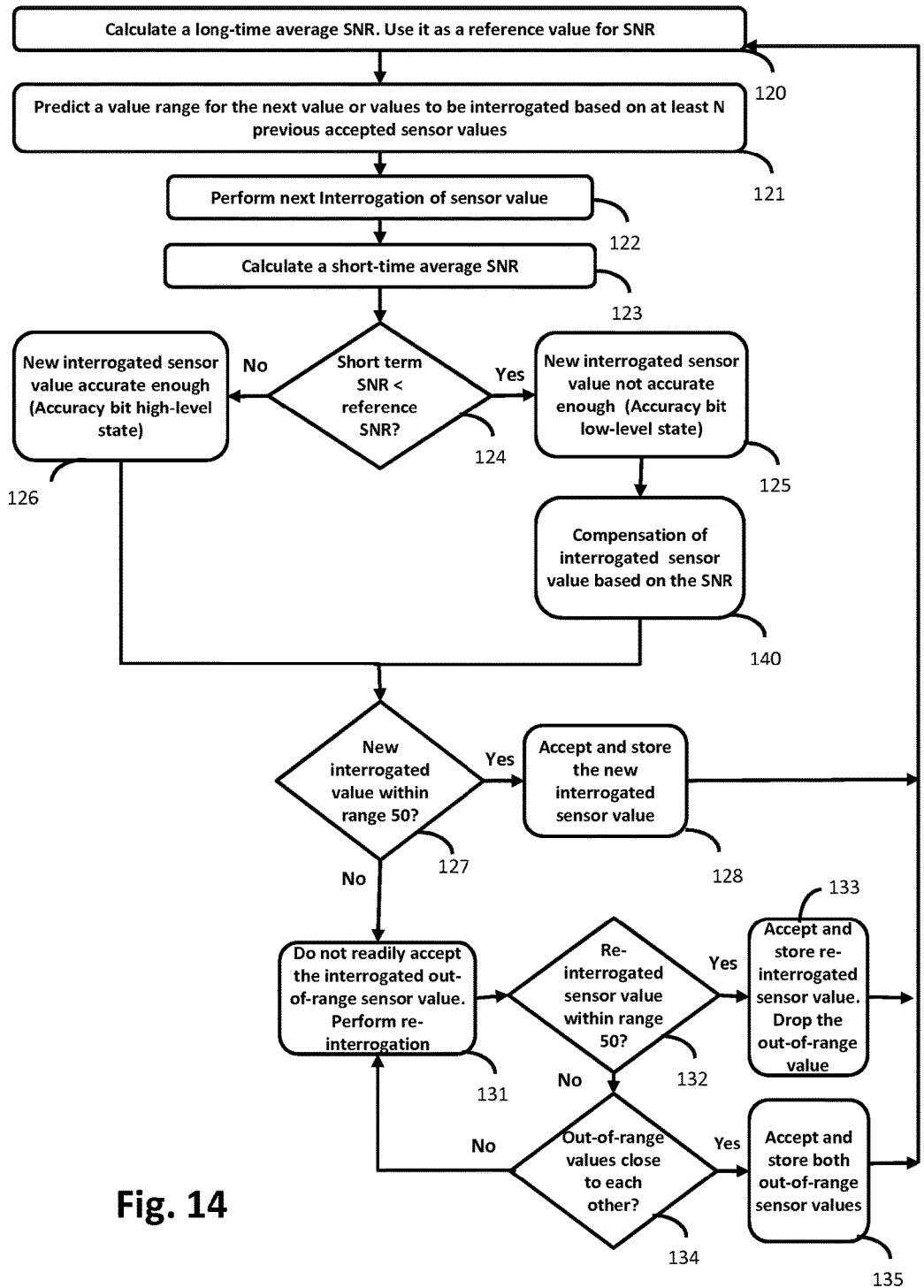
FIG. 14 is a flow diagram illustrating an exemplary control procedure wherein a statistical control of the interrogation rate R based on the interrogated sensor values is provided with a compensation of an inaccuracy of the interrogated sensor values due to the signal-noise-ratio (SNR)

FIG. 14 illustrates a flow diagram illustrating an exemplary control procedure a statistical control of the interrogation rate R based on the interrogated sensor values is arranged to take into account an inaccuracy of the interrogated sensor values possibly caused by the signal-noise-ratio (SNR) by compensating the inaccurate values based on the SNR. Similar control procedure may be carried out separately for each sensor around. In this example the statistical criterion is a variance of the interrogated sensor values.

Same reference numerals in FIGS. 12 and 13 refer to same or similar steps. In the exemplary method shown in FIG. 13, the steps 123-126 may be carried out in a similar manner as described with reference to FIG. 12. From step 126, upon determining that the new interrogated sensor value is accurate enough, the procedure may proceed to step 127. For an accurate interrogated sensor values, the following steps 127-135 may be carried out as the corresponding steps in FIG. 12.

From step 125, upon determining that the new interrogated sensor value is not accurate enough (i.e. it is inaccurate) (step 125 in FIG. 12), the reader may carry out compensation of the new interrogated sensor value based on the SNR (step 140) and the procedure may proceed to step 127. The following steps 127-135 may be carried out for the SNR compensated interrogated sensor value in a similar manner as for an original accurate interrogated value. For example, in step 127 it may be checked whether the SNR compensated interrogated sensor value falls within the predicted value range 50 of that sensor P. If the SNR compensated interrogated value is within the predicted value range 50, the SNR compensated interrogated value is accepted and stored (step 128 in FIG. 12) and the process may return to step 120. If the SNR compensated interrogated sensor value from the sensor is not within the predicted range 50 of the sensor (step 127), may proceed from step 127 to step 131.

In some embodiments, re-interrogation according to step 131 may include processing the re-interrogated sensor value in a similar manner as described for a new interrogated value with reference to steps 123-125 and 140. In other words, a short-time average of the SNR may be calculated for the reinterrogated sensor value, the re-interrogated sensor value may be determined as an accurate or inaccurate based on the SNR, and the inaccurate reinterrogated sensor value may be compensated based on the SNR.

The SNR compensation step 140 may be implemented as illustrated in FIG. 15, for example.

It should be appreciated the adaptive reader according to embodiments of the invention may be implemented with an RFID reader having sufficient computation capacity or with an RFID reader connected to a computing device that performs at least part of the computation required.

It will be obvious to a person skilled in the art that the inventive concept can be implemented in various obvious alternative ways. The invention and its embodiments are not limited to the examples described above but may vary within the scope of the claims.

The invention claimed is:

1. A method of controlling interrogation of sensor values in a system having a radio frequency identification (RFID) reader and at least one passive RFID sensor tag having at least one sensing element that provides a value of a quantity sensed by the sensing element, comprising
sending a radio frequency interrogation signal from the RFID reader to the passive RFID sensor tag;
receiving at the RFID reader from the passive RFID tag a backscattered radio frequency signal carrying the value of the sensed quantity;
controlling an interrogation rate of the sensing element and/or accuracy of received values of the sensed quantity based on a statistical analysis of the multiple received values of the sensed quantity.

2. The method as claimed in claim 1, wherein the statistical analysis comprises comparing a new interrogated value and/or a signal-to-noise ratio of a new interrogated value with a criterion created based on the multiple received values of the sensed quantity.

3. The method as claimed in claim 2, wherein the criterion comprises at least one of a predicted value or value range of the value of a sensed quantity, a variance of a sensed quantity, a long-time average of a variance of a sensed quantity, an average of a signal-to-noise ratio of the backscattered signal over multiple integrations of the sensing element.

4. The method as claimed in claim 1, wherein the controlling comprises
maintaining the interrogation rate of the sensing element, if a new interrogated value of the sensed quantity is acceptable according to said statistical analysis; and
increasing at least temporarily the interrogation rate of the sensing element, if a new interrogated value of the sensed quantity is not acceptable according to said statistical analysis.

5. The method as claimed in claim 1, wherein controlling comprises
associating a new interrogated value of the sensed quantity with an accuracy information provided based on a signal-to-noise ratio of the backscattered signal, and/or
rejecting a new interrogated value of the sensed quantity based on a signal-to-noise ratio of the backscattered signal, and/or
adjusting a new interrogated value of the sensed quantity based on a signal-to-noise ratio of the backscattered signal to improve accuracy.

6. The method as claimed in claim 1, wherein the controlling comprises
a) predicting a value range for a next value or next values to be interrogated from the sensing element based on a plurality of previous interrogated values of the quantity sensed by the sensing element;
b) maintaining the interrogation rate of the sensing element, if a new interrogated value of the sensed quantity falls within the predicted value range of the sensing element; and
c) increasing at least temporarily the interrogation rate of the sensing element, if a new interrogated value of the sensed quantity falls out of the predicted value range of the sensing element.

7. The method as claimed in claim 6, wherein the increasing at least temporarily the interrogation rate of the sensing element comprises immediately reinterrogating the sensing element.

8. The method as claimed in claim 6, wherein the increasing at least temporarily the interrogation rate of the sensing element comprises performing immediate reinterrogations of the sensing element until the interrogated value of the sensed quantity is acceptable according to said statistical analysis.

9. The method as claimed in claim 6, wherein the controlling comprises
updating the predicted value with each accepted interrogated value of the sensed quantity.

10. The method as claimed in claim 1, wherein the controlling comprises
a) predicting a value range for a next value or next values to be interrogated from the sensing element based on a plurality of previous interrogated values of the quantity sensed by the sensing element;
b) accepting a new interrogated value of the sensed quantity, if the new interrogated value falls within the predicted value range of the sensing element;
c) reinterrogating immediately the sensing element, if said new interrogated value of the sensed quantity falls out of the predicted value range of the sensing element;
d) accepting the reinterrogated value of the sensed quantity, if the reinterrogated value falls within the predicted value range of the sensing element, and dropping said new interrogated value;
e) accepting both said new interrogated value and said reinterrogated value of the sensed quantity, if also the reinterrogated value falls out of the predicted value range of the sensing element but said new interrogated value and said reinterrogated value are close to each other;

f) reinterrogating immediately the sensing element, if also said reinterrogated value of the sensed quantity falls out of the predicted value range of the sensing element and said new interrogated value and said reinterrogated value are close to each other; and g) continuing immediate reinterrogations of the sensing element until the reader obtains and accepts a reinterrogated value falling within the predicted value range or two reinterrogated values falling out of the predicted value range but being close to each other.

11. The method as claimed in claim 1, wherein the controlling comprises determining a long-time average of signal/noise ratio (SNR) of the backscattered signal during interrogation of the sensing element; and controlling the interrogation power and/or the interrogation rate of the sensing element using the long-time average of the SNR as a control reference.

12. The method as claimed in claim 1, further comprising:

determining a long-time average of a variance of the interrogated sensor values of the sensing element; and controlling the interrogation power and/or the interrogation rate of the sensing element using the long-time average of a variance of the interrogated sensor values as a control reference.

13. The method as claimed in claim 1, further comprising: controlling the interrogation rate of the sensing element and the power of the radio frequency interrogation signal transmitted to the sensing element in parallel or in combination.

14. The method as claimed in claim 13, further comprising:

determining a long-time averages of signal/noise ratio (SNR) of the backscattered signal during interrogation of the sensing element in function of a variance of the interrogated sensor values;

controlling the power of the radio frequency interrogation signal transmitted to the sensing element using as a control reference the long-time average of the SNR corresponding a present variance of one or more latest interrogated sensor values;

determining a long-time average of a variance of the interrogated sensor values of the sensing element; and controlling the interrogation rate of the sensing element using the long-time average of a variance of the interrogated sensor values as a control reference.

15. The method as claimed in claim 13, further comprising: controlling primarily the power of the radio frequency interrogation signal transmitted to the sensing element and controlling secondarily the interrogation rate of the sensing element.

16. The method according to claim 13, further comprising:

increasing the interrogation rate of the sensing element only if the power of the radio frequency interrogation signal cannot be increased.

17. The method as claimed in claim 1, wherein the controlling comprises determining a signal/noise ratio (SNR) of the backscattered signal during interrogation of an interrogated sensor value; and compensating an effect of a low signal/noise ratio (SNR) on the interrogated sensor value based on pre-stored compensation values and/or a compensation function, particularly if the power of the radio frequency interrogation signal cannot be increased.

18. A radio frequency identification (RFID) reader, comprising:

a sender sending a radio frequency interrogation signal from the RFID reader to at least one passive RFID sensor tag having at least one sensing element that provides a value of a quantity sensed by the sensing element;

a receiver receiving the passive RFID tag a backscattered radio frequency signal carrying the value of the sensed quantity;

a controller programmed to control an interrogation rate of the sensing element and/or accuracy of received values of the sensed quantity based on a statistical analysis of the multiple received values of the sensed quantity.

19. A system, comprising:

a radio frequency identification (RFID) reader including:

a sender sending a radio frequency interrogation signal from the RFID reader to at least one passive RFID sensor tag having at least one sensing element that provides a value of a quantity sensed by the sensing element, and a receiver receiving the passive RFID tag a backscattered radio frequency signal carrying the value of the sensed quantity; and a processor operationally connected the RFID reader and configured to control an interrogation rate of the sensing element and/or accuracy of received values of the sensed quantity based on a statistical analysis of the multiple received values of the sensed quantity.

* * * * *